(12) United States Patent
Lin et al.

(10) Patent No.: US 11,010,681 B2
(45) Date of Patent: May 18, 2021

(54) DISTRIBUTED COMPUTING SYSTEM, AND DATA TRANSMISSION METHOD AND APPARATUS IN DISTRIBUTED COMPUTING SYSTEM

(71) Applicant: Huawei Technologies Co., Ltd., Guangdong (CN)

(72) Inventors: Jian Lin, Shenzhen (CN); Mingzhen Xia, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/805,007

(22) Filed: Feb. 28, 2020

(65) Prior Publication Data

US 2020/0202246 A1 Jun. 25, 2020

Related U.S. Application Data

(63) Continuation of application No. PCT/CN2018/102919, filed on Aug. 29, 2018.

(30) Foreign Application Priority Data

Aug. 31, 2017 (CN) .......................... 201710769632.8

(51) Int. Cl.
*G06N 7/00* (2006.01)
*G06F 16/901* (2019.01)
(Continued)

(52) U.S. Cl.
CPC ......... *G06N 7/005* (2013.01); *G06F 16/9024* (2019.01); *H04L 47/125* (2013.01); *H04L 47/2441* (2013.01)

(58) Field of Classification Search
CPC ... G06N 7/005; G06F 16/9024; H04L 47/125; H04L 47/2441
See application file for complete search history.

(56) References Cited

U.S. PATENT DOCUMENTS 9,201,688 B2 12/2015 Michailov et al.
2012/0158651 A1* 6/2012 Michailov ............. G06F 9/4881
707/613
(Continued)

FOREIGN PATENT DOCUMENTS

CN 103970580 A 8/2014
CN 105224502 A 1/2016
(Continued)

OTHER PUBLICATIONS

Abhinav Vishnu et al: "Distributed TensorFlow with MPI", arxiv. org, Cornell University Library, 201OLin Library Cornell University Ithaca, NY 14853, Mar. 2016, XP080687837, total 6 pages.
(Continued)

*Primary Examiner* — Philip J Chea
*Assistant Examiner* — Hassan A Khan
(74) *Attorney, Agent, or Firm* — Womble Bond Dickinson (US) LLP

(57) ABSTRACT

A distributed computing system is provided. Both a first computing node and a second computing node in the distributed computing system store information about a name, a size, and a communication peer side identifier of a first data flow graph parameter in a data flow graph. The first computing node stores the first data flow graph parameter, where the first computing node and the second computing node generate respective triplets based on same interface parameter generation algorithms and information about the first data flow graph parameter that are stored in the respective nodes. The triplet is used as an interface parameter of a message passing interface (MPI) primitive that is used to transmit the first data flow graph parameter between the first computing node and the second computing node.

11 Claims, 8 Drawing Sheets

(51) Int. Cl.
*H04L 12/803* (2013.01)
*H04L 12/851* (2013.01)

(56) References Cited

U.S. PATENT DOCUMENTS

2016/0378560 A1* 12/2016 Lu .................. G06F 9/5066
                                                    718/104
2019/0391791 A1* 12/2019 Bebee .............. G06F 8/4441

FOREIGN PATENT DOCUMENTS

| CN | 105227669 A | 1/2016 |
| CN | 102708404 B | 8/2016 |
| CN | 105843706 A | 8/2016 |
| CN | 106547522 A | 3/2017 |

OTHER PUBLICATIONS

Team Open Mpi: "MPI_Send(3) man page (version 1.8.8)", Jan. 16, 2016 (Jan. 16, 2016), Retrieved from the internet:"https://www.open-mpi.org/doc/v1.8/man3/MPI_Send.3.php", XP055716296, total 2 pages.

Team Open Mpi: "MPI_Recv(3) man page (version 1.8.8)", Jan. 16, 2016 (Jan. 16, 2016), Retrieved from the internet: "https://www.open-mpi.org/doc/v1.8/man3/MPI_Recv.3.php", XP055716299, total 4 pages.

Martin Abadi et al: "TensorFlow: A system for large-scale machine learning", 12th USENIX Symposium on Operating Systems Design and Implementation, Nov. 2, 2016 (Nov. 2, 2016), Retrieved from the internet: https://www.usenix.org/sites/default/files/osdi16_full_proceedings_interior.pdf, XP061025043, total 19 pages.

Martin Abadi et al: "TensorFlow: large-scale machine learning on heterogeneous distributed systems", Retrieved from the internet:"http://download.tensorflow.org/paper/whitepaper2015.pdf", XP055498936, total 19 pages.

Peter Goldsborough: A Tour of TensorFlow Proseminar Data Mining, retrieved from the internet: https://arxiv.org/pdf/1610.01178.pdf, arXiv:1610.01178v1 [cs.LG] Oct. 1, 2016, XP55717002, total 16 pages.

* cited by examiner

DISTRIBUTED COMPUTING SYSTEM, AND DATA TRANSMISSION METHOD AND APPARATUS IN DISTRIBUTED COMPUTING SYSTEM

CROSS-REFERENCE TO RELATED APPLICATIONS

This application is a continuation of International Application No. PCT/CN2018/102919, filed on Aug. 29, 2018, which claims priority to Chinese Patent Application No. 201710769632.8, filed on Aug. 31, 2017, the disclosures of which are incorporated herein by reference in their entireties.

TECHNICAL FIELD

The present disclosure relates to a computer field, and in particular, to a distributed computing system, and a data transmission method and apparatus in the distributed computing system.

BACKGROUND

With development of the big data industry and the artificial intelligence technology, various computing platforms such as a machine learning platform, a graph computing platform, and a flow computing platform constantly emerge. These computing platforms are usually deployed in a distributed computing system to perform big data computing. For example, the machine learning platform usually uses a data flow graph as a computing object, divides the data flow graph into a plurality of subgraphs or copies, and deploys the plurality of subgraphs or copies on a plurality of computing nodes in the distributed computing system, so that the plurality of computing nodes may be used to perform collaborative computing on the data flow graph, to improve data computing efficiency. A computing node in the plurality of computing nodes may include a plurality of devices used for computation, such as a CPU (central processing unit) and acceleration hardware that is equipped in a host of the computing node. For example, the acceleration hardware may be a GPU (graphics processing unit).

However, in a computation process of the data flow graph in the distributed computing system, communication for a data flow graph parameter needs to be performed between nodes. Such communication directly affects efficiency of computing the data flow graph by the machine learning platform. In an existing solution, a message passing interface (MPI) library that is usually applied to the high-performance computing field is introduced into a distributed computing system as an external plug-in unit, to support data communication in the system. However, before data communication is performed in the MPI library, two parties that need to perform data communication exchange information to obtain information about a communication peer side, so as to obtain, through negotiation, a communication parameter used for an MPI primitive. However, because a communication time sequence of a computing platform is dynamic and random, it is difficult for the two parties for data communication to determine a peer end and perform negotiation in a timely manner. The negotiation process further increases data communication load on the computing platform, thereby affecting data transmission efficiency.

SUMMARY

Embodiments of the present disclosure provide a data transmission method and apparatus in a distributed computing system, and the distributed computing system. This can simplify a communication process in which an MPI technology is applied to computation of a data flow graph. Communication peer sides do not need to negotiate peer information with each other before data transmission. Therefore, the MPI technology can better adapt to a computing platform that is deployed in a distributed manner, to improve data transmission efficiency in the distributed computing system, and improve efficiency of computing a data flow graph in the distributed computing system.

To achieve the foregoing objective, the following technical solutions are used in the embodiments of the present disclosure.

According to a first aspect, this application provides a distributed computing system. The distributed computing system includes a first computing node and a second computing node, a first graph data structure in the first computing node stores a name, a size, and a communication peer side identifier of a first data flow graph parameter in a first data flow graph, the first data flow graph parameter is a parameter carried by a connection edge of the first data flow graph, a second graph data structure in the second computing node stores the name, the size, and a communication peer side identifier of the first data flow graph parameter in a second data flow graph, the communication peer side identifier of the first data flow graph parameter in the first data flow graph corresponds to the second computing node, and the communication peer side identifier of the first data flow graph parameter in the second data flow graph corresponds to the first computing node. The first computing node is configured to generate a first triplet based on the name, the size, and the communication peer side identifier of the first data flow graph parameter in the first graph data structure according to a first interface parameter generation algorithm. The first triplet includes a message tag, a message size, and a destination process sequence number. The message tag corresponds to the name of the first data flow graph parameter, the message size corresponds to the size of the first data flow graph parameter, and the destination process sequence number corresponds to a process that is on the second computing node and that receives the first data flow graph parameter. The second computing node is configured to generate a second triplet based on the name, the size, and the communication peer side identifier of the first data flow graph parameter in the second graph data structure according to a second interface parameter generation algorithm. The second interface parameter generation algorithm is the same as the first interface parameter generation algorithm, the second triplet includes the message tag, the message size, and a source process sequence number, and the source process sequence number corresponds to a process that is on the first computing node and that sends the first data flow graph parameter. The first computing node is configured to invoke a message passing interface MPI sending primitive by using the first triplet as an interface parameter, to send the first data flow graph parameter to the second computing node. The second computing node is configured to invoke an MPI receiving primitive based on the second triplet, to process the first data flow graph parameter.

In one embodiment, an MPI sending primitive whose interface parameter is the first triplet corresponds to an MPI receiving primitive whose interface parameter is the second triplet. In this case, the first graph data structure and the second graph data structure include the communication peer side identifiers, to resolve a problem that a process of a communication peer side is unknown in a data flow graph running process. In addition, two communications parties that need to transmit the first data flow graph parameter generate triplets by using respective information in data flow graphs and same interface parameter generation algorithms that are stored in respective computing nodes, without a need to exchange respective information with peer ends, and without a need to negotiate an algorithm for generating the triplets. The method can be independently performed in a data sender and a data receiver, and a corresponding triplet is generated when the two parties do not interact with each other. This simplifies a process of communication performed by using an MPI primitive, and improves data transmission efficiency on a distributed computing platform.

It should be understood that the MPI receiving primitive is invoked based on the second triplet, to process the first data flow graph parameter, so that the first data flow graph parameter can be used to compute a data flow graph in a process of the second computing node. For the invoking an MPI receiving primitive to process the first data flow graph parameter, the "processing" may correspond to different operations in different scenarios. This is not limited in this application. For example, the "processing" may be one or more of the following operations: invoking the MPI receiving primitive to receive the first data flow graph parameter and store the first data flow graph parameter into a data buffer of a host memory; invoking the MPI receiving primitive to modify a tag of the first data flow graph parameter, to provide the first data flow graph parameter in the host memory to use the first data flow graph parameter in a process of computing the data flow graph; and storing the first data flow graph parameter into a destination address from the data buffer.

The name of the first data flow graph parameter is used to identify the first data flow graph parameter, and may be a field in the first graph data structure, or may be information distributed in the first graph data structure. The size of the first data flow graph parameter is used to indicate storage space occupied by the first data flow graph parameter, namely, a data amount of the data flow graph parameter.

The communication peer side identifier of the first data flow graph parameter in the first data flow graph may be an identifier of the second computing node; an identifier of a storage device in which a destination address of the first data flow graph parameter is located, where the storage device is located on the second computing node; an identifier of a destination process corresponding to the first data flow graph parameter, where the destination process is located in the second computing node; or other information that is used to indicate a receive end of the first data flow graph parameter.

Similarly, the communication peer side identifier of the first data flow graph parameter in the second data flow graph may be an identifier of the first computing node; an identifier of a storage device in which a source address of the first data flow graph parameter is located, where the storage device is located on the first computing node; an identifier of a process that is on the first computing node and that sends the first data flow graph parameter in a summarization manner; or other information that is used to indicate a transmit end of the first data flow graph parameter.

That the first graph data structure in the first computing node stores the name, the size, and the communication peer side identifier of the first data flow graph parameter in the first data flow graph may be that the first graph data structure includes fields that carry the three types of information, or may be that the first graph data structure stores information that can be used to obtain the name, the size, or the communication peer side identifier of the first data flow graph parameter. To be specific, the "storing" may be that the name, the size, and the communication peer side identifier of the first data flow graph parameter can be directly read from the first graph data structure, or may be that the name, the size, and the communication peer side identifier of the first data flow graph parameter is obtained by analyzing the information in the first graph data structure.

The second data flow graph is stored in the second computing node. The second data flow graph may be a copy of the first data flow graph. Alternatively, the second data flow graph and the first data flow graph may be two subgraphs of a data flow graph.

The message tag is used to indicate data sent by using the MPI sending primitive. The message size is used to indicate a size of information sent by using the MPI sending primitive. The source process sequence number is a sequence number of a process that is on the first computing node and that executes the MPI sending primitive, and the destination process sequence number is a sequence number of a process that is on the second computing node and that executes an MPI receiving primitive corresponding to the MPI sending primitive. A concept of a triplet is only used to represent three parameters in the triplet, but does not limit a sequence of the three parameters. Formats of the three parameters in the triplet meet a format requirement of an interface function parameter carried in the MPI sending primitive. In addition, an interface parameter of the MPI sending primitive includes but is not limited to the first triplet, and an interface parameter of the MPI receiving primitive includes but is not limited to the second triplet.

In one embodiment, in the aspect of invoking a message passing interface MPI sending primitive by using the first triplet as an interface parameter, to send the first data flow graph parameter to the second computing node, the first computing node is configured to read the first data flow graph parameter from a host memory in the first computing node by using the first triplet as the interface parameter and by using the message passing interface MPI sending primitive, to send the first data flow graph parameter to the second computing node.

In one embodiment, the MPI sending primitive is used to directly read the first data flow graph parameter from the host memory, so that data reading efficiency can be improved.

In one embodiment, the first computing node further stores information about a storage device in which the first data flow graph parameter is located, and the first computing node is further configured to: when the information about the storage device indicates another storage device, copy the first data flow graph parameter from the another storage device into the host memory in the first computing node, where the another storage device is a memory in the first computing node other than the host memory.

The information about the storage device may be an identifier of the storage device, or may be a number used to indicate the storage device. A storage type of the storage device may be determined based on the identifier or the number. Alternatively, the information about the storage device may be information that identifies a type of the storage device, information that is in another form and that can be used to reach the foregoing function, or the like.

In this way, before using the MPI sending primitive, the first computing node prepares the first data flow graph parameter in the host memory in the first computing node, and the MPI sending primitive is used to read the first data flow graph parameter from only the host memory in the first computing node, and does not need to be used to contend against a computing platform for reading of a resource from the another storage device. Therefore, execution efficiency of the MPI sending primitive is improved.

In one embodiment, the first interface parameter generation algorithm includes a first algorithm, a second algorithm, and a third algorithm, and in the aspect of generating a first triplet based on the name, the size, and the communication peer side identifier of the first data flow graph parameter in the first graph data structure according to a first interface parameter generation algorithm, the first computing node is configured to: determine the message tag in the first triplet based on the name of the first data flow graph parameter in the first graph data structure according to the first algorithm, determine the message size in the first triplet based on the size of the first data flow graph parameter in the first graph data structure according to the second algorithm, and determine the destination process sequence number in the first triplet based on the communication peer side identifier of the first data flow graph parameter in the first graph data structure according to the third algorithm; and correspondingly, in the aspect of generating a second triplet based on the name, the size, and the communication peer side identifier of the first data flow graph parameter in the second graph data structure according to a second interface parameter generation algorithm, the second computing node is configured to: determine the message tag in the second triplet based on the name of the first data flow graph parameter in the second graph data structure according to a first algorithm in the second interface parameter generation algorithm, determine the message size in the second triplet based on the size of the first data flow graph parameter in the second graph data structure according to a second algorithm in the second interface parameter generation algorithm, and determine the source process sequence number in the second triplet based on the communication peer side identifier of the first data flow graph parameter in the second graph data structure according to a third algorithm in the second interface parameter generation algorithm.

That the first interface parameter generation algorithm is the same as the second interface parameter generation algorithm means that the first interface parameter generation algorithm includes the first algorithm, the second algorithm, and the third algorithm, and the second interface parameter generation algorithm includes the first algorithm, the second algorithm, and the third algorithm that are the same as or correspond to those included in the first interface parameter generation algorithm.

The first algorithm may be an algorithm for converting any binary length value into a fixed binary length value, for example, may be a hash algorithm, or may be another algorithm that can be used to convert the name of the first data flow graph parameter into a format of a message tag in an interface parameter that conforms to an MPI primitive. In one embodiment, the second algorithm may be used to enable a value of a message size field to be equal to a parameter value of the size of the data flow graph parameter, namely, the size. In another embodiment, the second algorithm may be used to enable a value of the message size field to be equal to a value plus a parameter value of the size of the data flow graph parameter. The third algorithm is a mapping relationship between the process sequence number and the communication peer side identifier. The first computing node includes a mapping relationship between the destination process sequence number and the communication peer side identifier, and the second computing node includes a mapping relationship between the source process sequence number and the communication peer side identifier. The third algorithm may be a function relationship, or may be a mapping table maintained in a computing node. This is not limited in this application.

In one embodiment, in the aspect of invoking an MPI receiving primitive based on the second triplet, to process the first data flow graph parameter, the second computing node is configured to: detect a data cache in a host memory in the second computing node by using an MPI probe primitive, to obtain the second triplet of the first data flow graph parameter, where the data cache is configured to store data processed by using an MPI primitive; and invoke the MPI receiving primitive to process the first data flow graph parameter, where an interface parameter of the MPI receiving primitive includes the second triplet.

In this way, data can be processed, in a more timely manner, by using a receiving primitive, and another to-be-executed sending primitive of the first computing node can be executed more quickly. Therefore, data transmission efficiency is improved. In addition, a dedicated data cache and a dedicated polling thread are set, so that in a message passing communication buffer, when a message receiving primitive is not invoked and a final destination address of a message is unknown, a message sending primitive can be used to send data, and a data sending result is immediately returned after sending of the data is completed. The buffer temporarily stores data for a future message receiving primitive, so that a synchronization operation is performed for the message sending primitive and the message receiving primitive. This removes an inherent time sequence constraint on the message sending primitive and the message receiving primitive. The sender does not need to synchronously wait, so that the sender reduces an execution time, and performance is improved.

In one embodiment, the receiving primitive of the first data flow graph parameter carries a destination address of the first data flow graph parameter, and in an aspect of processing the first data flow graph parameter by using the receiving primitive of the first data flow graph parameter, the second computing node is configured to invoke the MPI receiving primitive by using the second triplet as an interface parameter of the MPI receiving primitive, to store the first data flow graph parameter into the destination address from the data cache. For example, the destination address is located in user memory space in the host memory.

According to a second aspect, an embodiment of the present disclosure records a data transmission method in a distributed computing system. The distributed computing system includes a first computing node and a second computing node, and the method includes: determining a name, a size, and a communication peer side identifier of a first data flow graph parameter in a first data flow graph from a first graph data structure in the first computing node, where the first data flow graph parameter is a parameter carried by a connection edge of the first data flow graph, and the communication peer side identifier corresponds to the second computing node; generating a first triplet based on the name, the size, and the communication peer side identifier of the first data flow graph parameter in the first graph data structure according to a first interface parameter generation algorithm, where the first triplet includes a message tag, a message size, and a destination process sequence number, the message tag corresponds to the name of the first data flow graph parameter, the message size corresponds to the size of the first data flow graph parameter, and the destination process sequence number corresponds to a process that is on the second computing node and that receives the first data flow graph parameter; and invoking a message passing interface MPI sending primitive by using the first triplet as an interface parameter, to send the first data flow graph parameter to the second computing node, so that the second computing node invokes an MPI receiving primitive by using, as an interface parameter, a second triplet corresponding to the first triplet, to process the first data flow graph parameter, where the second triplet is generated based on a second graph data structure in the second computing node according to a second interface parameter generation algorithm, and the second interface parameter generation algorithm is the same as the first interface generation algorithm.

In one embodiment, in the aspect of invoking a message passing interface MPI sending primitive by using the first triplet as an interface parameter, to send the first data flow graph parameter to the second computing node, the method includes: reading the first data flow graph parameter from a host memory in the first computing node by using the first triplet as the interface parameter and by using the message passing interface MPI sending primitive, to send the first data flow graph parameter to the second computing node.

In one embodiment, the first computing node further stores information about a storage device in which the first data flow graph parameter is located, and the method further includes: when the information about the storage device indicates another storage device, copying the first data flow graph parameter from the another storage device into the host memory in the first computing node, where the another storage device is a memory in the first computing node other than the host memory.

According to a third aspect, an embodiment of the present disclosure records a data transmission apparatus in a distributed computing system. The distributed computing system includes a first computing node and a second computing node, the data transmission apparatus is located on the first computing node, and the data transmission apparatus includes: a determining module, where the determining module is configured to determine a name, a size, and a communication peer side identifier of a first data flow graph parameter in a first data flow graph from a first graph data structure in the first computing node, where the first data flow graph parameter is a parameter carried by a connection edge of the first data flow graph, and the communication peer side identifier corresponds to the second computing node; a generation module, where the generation module is configured to generate a first triplet based on the name, the size, and the communication peer side identifier of the first data flow graph parameter in the first graph data structure according to a first interface parameter generation algorithm, where the first triplet includes a message tag, a message size, and a destination process sequence number, the message tag corresponds to the name of the first data flow graph parameter, the message size corresponds to the size of the first data flow graph parameter, and the destination process sequence number corresponds to a process that is on the second computing node and that receives the first data flow graph parameter; and a communications module, where the communications module is configured to invoke a message passing interface MPI sending primitive by using the first triplet as an interface parameter, to send the first data flow graph parameter to the second computing node, so that the second computing node invokes an MPI receiving primitive by using, as an interface parameter, a second triplet corresponding to the first triplet, to process the first data flow graph parameter, where the second triplet is generated based on a second graph data structure in the second computing node according to a second interface parameter generation algorithm, and the second interface parameter generation algorithm is the same as the first interface generation algorithm.

According to a fourth aspect, a physical machine is disclosed. The physical machine includes at least one processor and a non-transitory computer readable medium that stores executable code to run a first computing node in a distributed computing system, the distributed computing system includes the first computing node and a second computing node, and when the executable code is executed by a processor in the at least one processor, the processor is configured to perform any method performed by the first computing node in the foregoing system.

It can be learned that the fourth aspect and the third aspect describe apparatuses corresponding to the method in the second aspect, and the method in the second aspect is performed by the first computing node. In some embodiments, the first computing node is the first computing node in the system in the first aspect. For descriptions of steps in the second aspect, the third aspect, and the fourth aspect, explanations of terms, embodiments, and beneficial effects, descriptions of the first computing node in the system in the first aspect are also applicable, and reference may be made to related content in the first aspect. Details are not described herein again.

According to a fifth aspect, a data transmission method in a distributed computing system is disclosed. The distributed computing system includes a first computing node and a second computing node, and the method includes: determining a name, a size, and a communication peer side identifier of a first data flow graph parameter in a second data flow graph from a second graph data structure in the second computing node, where the communication peer side identifier of the first data flow graph parameter in the second data flow graph corresponds to the first computing node; generating a second triplet based on the name, the size, and the communication peer side identifier of the first data flow graph parameter in the second graph data structure according to a second interface parameter generation algorithm, where the second triplet includes a message tag, a message size, and a source process sequence number, the message tag corresponds to the name of the first data flow graph parameter, the message size corresponds to the size of the first data flow graph parameter, and the source process sequence number corresponds to a process that is on the first computing node and that sends the first data flow graph parameter; and invoking a message passing interface MPI receiving primitive based on the second triplet, to process the first data flow graph parameter from the first computing node, where the first data flow graph parameter is sent by the first computing node by using an MPI sending primitive, an interface parameter of the MPI sending primitive includes a first triplet corresponding to the second triplet, the first triplet is generated by the first computing node based on a first graph data structure in the first computing node according to a first interface parameter generation algorithm, and the second interface parameter generation algorithm is the same as the first interface generation algorithm.

In one embodiment, the second computing node invokes the message passing interface MPI receiving primitive by using the second triplet as an interface parameter, to receive the first data flow graph parameter, so that the second computing node computes a data flow graph by using the first data flow graph parameter.

In one embodiment, a first thread and a second thread run on the second computing node, a host memory in the second computing node includes a data cache, the data cache is specially configured to store data processed by using an MPI primitive, and in the aspect of invoking a message passing interface MPI receiving primitive by using the second triplet as an interface parameter, to process the first data flow graph parameter from the first computing node, the method includes: detecting, by the first thread, the data cache in the host memory by using a message passing interface MPI probe primitive, to obtain the second triplet; invoking, by the first thread, a first MPI receiving primitive based on a second triplet in the data cache, to process the first data flow graph parameter, where the second triplet in the data cache is obtained by the second computing node based on the MPI sending primitive; and modifying, by the second thread, a second MPI receiving primitive into an MPI wait primitive after determining that the first data flow graph parameter is processed by using the first MPI receiving primitive, where the second MPI receiving primitive is a receiving primitive that is not executed by the second thread and that corresponds to the first data flow graph parameter, an interface parameter of the second MPI receiving primitive includes a second triplet generated by the second computing node, and the MPI wait primitive is used to wait for completion of execution of the first MPI receiving primitive.

The second triplet may be obtained based on the received interface parameter of the MPI sending primitive, or may be obtained by analyzing the interface parameter and data transmitted by using the MPI sending primitive. This is not limited in this application.

That is, the second computing node may further pull a thread (which may be referred to as a polling thread) in the host memory to execute the MPI probe primitive, so as to detect a buffer in the host memory in the second computing node. The buffer includes the foregoing data cache. In this case, data that is not processed in a timely manner by using the MPI receiving primitive can be found.

In one embodiment, in the aspect of invoking, by the first thread, a first MPI receiving primitive based on a second triplet in the data cache, to process the first data flow graph parameter, the method includes: when a destination address of the first data flow graph parameter corresponds to memory space that is in the host memory in the second computing node and that is allocated to a user for use, invoking, by the first thread, the first MPI receiving primitive by using the second triplet in the data cache as an interface parameter of the first MPI receiving primitive, to store the first data flow graph parameter into the destination address of the first data flow graph parameter from the data cache.

In one embodiment, the second computing node stores the first data flow graph parameter in the host memory into the destination address when a destination address of the first data flow graph parameter corresponds to another storage device, where the another storage device is a memory in the second computing node other than the host memory.

According to a sixth aspect, a data transmission apparatus in a distributed computing system is disclosed. The distributed computing system includes a first computing node and a second computing node, the data transmission apparatus is located on the second computing node, and the data transmission apparatus includes: a determining module, where the determining module is configured to determine a name, a size, and a communication peer side identifier of a first data flow graph parameter in a second data flow graph from a second graph data structure in the second computing node, where the communication peer side identifier of the first data flow graph parameter in the second data flow graph corresponds to the first computing node; a generation module, where the generation module is configured to generate a second triplet based on the name, the size, and the communication peer side identifier of the first data flow graph parameter in the second graph data structure according to a second interface parameter generation algorithm, where the second triplet includes a message tag, a message size, and a source process sequence number, the message tag corresponds to the name of the first data flow graph parameter, the message size corresponds to the size of the first data flow graph parameter, and the source process sequence number corresponds to a process that is on the first computing node and that sends the first data flow graph parameter; and a communications module, where the communications module is configured to invoke a message passing interface MPI receiving primitive based on the second triplet, to process the first data flow graph parameter from the first computing node, where the first data flow graph parameter is sent by the first computing node by using an MPI sending primitive, an interface parameter of the MPI sending primitive includes a first triplet corresponding to the second triplet, the first triplet is generated by the first computing node based on a first graph data structure in the first computing node according to a first interface parameter generation algorithm, and the second interface parameter generation algorithm is the same as the first interface parameter generation algorithm.

According to a seventh aspect, a physical machine is disclosed. The physical machine includes at least one processor and a non-transitory computer readable medium that stores executable code to run a second computing node in a distributed computing system, the distributed computing system includes a first computing node and the second computing node, and when the executable code is executed by a processor in the at least one processor, the processor is configured to perform any one of the foregoing methods performed by the second computing node.

It can be learned that the sixth aspect and the seventh aspect describe apparatuses corresponding to the method in the fifth aspect, and the method in the fifth aspect is performed by the second computing node. In some cases, the second computing node is the second computing node in the system in the first aspect. For descriptions of steps in the fifth aspect, the sixth aspect, and the seventh aspect, explanations of terms, embodiments, and beneficial effects, descriptions of the second computing node in the system in the first aspect are also applicable, and reference may be made to related content in the first aspect. Details are not described herein again.

According to an eighth aspect, a non-transitory computer readable medium that stores an executable program is disclosed. The executable program is used to perform any method performed by the first computing node or the second computing node in the foregoing system. For descriptions of steps in the eighth aspect, explanations of terms, embodiments, and beneficial effects, the foregoing related descriptions are also applicable, and reference may be made to the foregoing related content. Details are not described herein again.

BRIEF DESCRIPTION OF DRAWINGS

To describe the technical solutions in the embodiments of the present disclosure more clearly, the following briefly describes the accompanying drawings required for describing the embodiments. Definitely, the accompanying drawings in the following description show merely some embodiments of the present disclosure.

DESCRIPTION OF EMBODIMENTS

Figure 1:
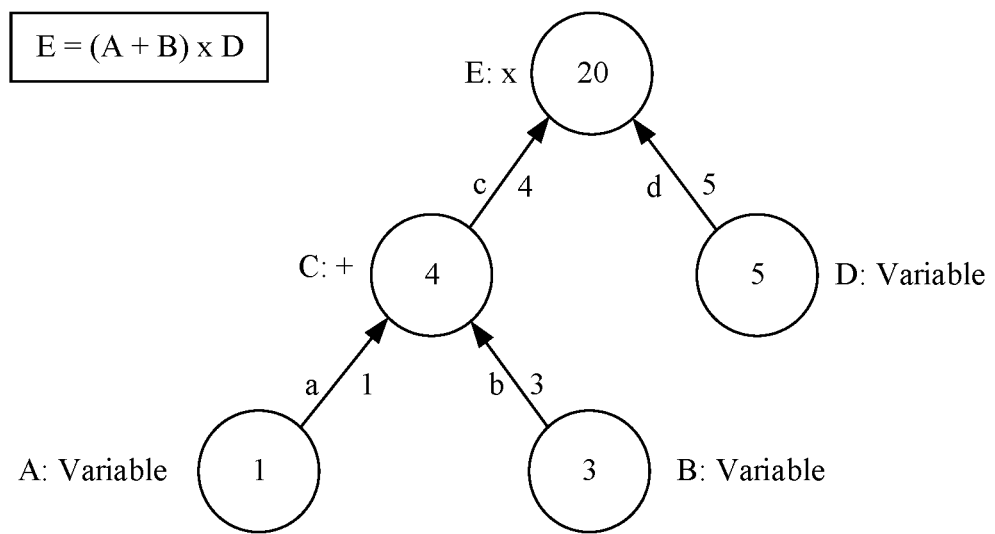
FIG. 1 is a schematic diagram of a data flow graph according to one embodiment.

In this specification, the character "/" usually indicates an "or" relationship between associated objects. For example, A/B may be understood as A or B, and "and/or" may be understood as "and" or "or".

In the specification and claims of the present disclosure, the terms "first", "second", and the like are not intended to describe a particular order of objects but to distinguish between different objects. In a case of a particular description, "first" and "second" may describe a same object. For example, without a specific description, a first process and a second process are different processes.

In descriptions of the present disclosure, "plurality" means two or more, unless otherwise stated. For example, a plurality of devices are two or more devices.

In addition, the terms "including" and "having", and any other variant thereof mentioned in the descriptions of the present disclosure are intended to cover a non-exclusive inclusion. For example, a process, a method, a system, a product, or a device that includes a series of steps or units is not limited to the listed steps or units, but may further include other unlisted steps or units, or may further include another step or unit of the process, the method, the product, or the device.

The following describes some terms in this application.

Message passing: In a computer system, the message passing is a general term of a type of data communication method performed between processes or software components. During message passing, to-be-communicated data is abstracted and encapsulated into a "message", and two or more parties participating in communication implement message passing between the processes or the components by invoking primitives such as message sending and receiving primitives, to complete data communication.

Primitive: A primitive is a segment of code that includes several instructions and that is used to complete a function or a process. The primitive needs to be continuously executed.

A computing node may be a physical machine, or may be a host, a virtual machine, or a container that runs on the physical machine. It should be understood that both the virtual machine and the container need to be deployed on the physical machine. In other words, a first computing node and a second computing node that are described below may be a same physical machine or different physical machines. For example, the computing nodes are virtual machines or containers deployed on a same physical machine. Certainly, a transmit end physical machine and a receive end physical machine that are described in the following embodiments may also be a same physical machine or different physical machines.

It should be noted that in this application document, the computing node and a node included in a data flow graph are terms of different properties, and have different semantics.

Device: A device is hardware on a physical machine. For example, the hardware can support running of a virtual machine, a container, a process, or a thread on the physical machine. For example, the device may be a computing device or a storage device. The computing device is hardware, on the physical machine, used for computing. The computing device may be a CPU, or may be a GPU, an FPGA (Field-Programmable Gate Array), a MIC (Many Integrated Core), or another hardware device having a computing capability. The storage device is hardware, on the physical machine, that can store data or code, for example, various memories used by the computing device, such as a host memory (also referred to as a CPU memory), a GPU memory, and an FPGA memory, or an external memory such as a hard disk or a compact disc.

Host: A host is a container (or mainframe), in a computer hardware system, in which a mainboard and another main component is placed. For example, the host may include a CPU, a memory, a hard disk, a power supply, and another input/output interface. For example, the input/output interface may be any one of a USB controller, a video card, a network adapter, and an audio adapter.

Data flow graph: A data flow graph is a data structure, in a graph form, that represents a flow direction and a computation relationship of data in computational logic to reflect a design principle and an embodiment of the computational logic. In this application, a common machine learning platform for computing a data flow graph is used as an example for description. It should be noted that, on the machine learning platform, the data flow graph is preloaded onto the platform before computation. This preloading process includes defining a node, an edge, and a parameter at the edge that are included in the data flow graph.

On the machine learning platform, computational logic of an algorithm is usually expressed in a form of a data flow graph. When the machine learning platform is used to compute the data flow graph, code needs to be first used to describe the data flow graph. The data flow graph is defined in this process. After the definition of the data flow graph is completed, the code is compiled. When the data flow graph is computed, the compiled code is read and executed instead of reading and executing the code used when the data flow graph is defined.

The data flow graph is a directed acyclic graph. The data flow graph includes several nodes and a connection edge between the nodes (briefly referred to as an "edge"). To be specific, the edge points from one node to another node.

The node and the edge may be explained in two cases: a case in which the data flow graph is defined and a case in which the data flow graph is run. When the data flow graph is defined, the node represents an operator or a variable used in a computation process. The operator is a symbol used to express an operation rule, such as addition (+), subtraction (−), multiplication (×), division (÷), integration ($\int$), differentiation, an exponent, a logarithm (log or ln), or another function form. Actually, the variable may also be considered as a special operator, namely, an operator with zero inputs and one output. The edge represents an operation relationship between operators and/or variables. When the data flow graph is run, the node represents storage of data, and each node corresponds to one storage location. For example, the node may include a physical address or a virtual address in a hard disk, a memory, or a CPU register. The data may be a variable, a value assigned to a variable, or an operation result. The operation result may be in a mathematical expression form such as a variable or a constant. The edge represents data transmission. To be specific, data in one node is transmitted to another node to which the edge points.

Communication peer side: For two communications parties, when a communication process of one party is described, the party is a local end, and the other party is a communication peer side. For example, a communication peer side of an end sending data (a transmit end of the data) is an end (a receive end of the data) receiving the data (a receive end of the data), and a communication peer side of an end receiving data (a receive end of the data) is an end sending the data (a transmit end of the data). The two communications parties may be described at a plurality of granularities such as a physical machine, a virtual machine, a container, a process, and a thread. For example, the end sending the data executes a sending primitive by using a process or a thread, to send the data, and the end receiving the data executes a receiving primitive by using a process or a thread, to receive the data. In this case, the process or the thread that executes the receiving primitive may also be referred to as the communication peer side of the transmit end of the data, or the process or the thread that executes the receiving primitive may be referred to as a communication peer side of the sending primitive. Similarly, the process or the thread that executes the sending primitive may be referred to as the communication peer side of the receive end of the data, or the process or the thread that executes the sending primitive may be referred to as a communication peer side of the receiving primitive. The foregoing expression in the following description is not described again.

Peer computing node: In a communication process of transmitting data from a computing node to another computing node, a computing node that sends the data by using a sending primitive is a source computing node, and a computing node that receives the data by using a receiving primitive is a destination computing node. A peer computing node of the source computing node of the data is the destination computing node of the data, and a peer computing node of the destination computing node of the data is the source computing node of the data.

Data flow graph parameter: A parameter in a data flow graph is data that is carried by on an edge of the graph and that is used to be processed or fed back by a computing node. To be specific, the data flow graph parameter is data that needs to be transmitted from a node (namely, a source node of the edge) to another node (namely, a destination node of the edge) to which the edge points. It is clearly that, for a data flow graph, transmission of a data flow graph parameter is a part of computation of the data flow graph. In addition, when storage locations indicated by nodes in a data flow graph are in a same device (for example, a same CPU memory or a same GPU memory), transmission of a data flow graph parameter may be an intra-process memory copy process. On the other hand, when storage locations indicated by nodes in a data flow graph cross devices (for example, a CPU memory and a GPU memory in a same host, or devices in different hosts), transmission of a data flow graph parameter may be an inter-process communication process, and if storage locations indicated by a source node and a destination node cross hosts, network-based communication is required.

A source address of the data flow graph parameter is a storage location of the data flow graph parameter in a source computing node, and the source address may be recorded in a source node of an edge that carries the data flow graph parameter.

A destination address of the data flow graph parameter is a storage location of the data flow graph parameter in a destination computing node, and the destination address may be recorded in a destination node of the edge that carries the data flow graph parameter.

Address of a node: For a node in a data flow graph, an address of the node may be a physical address or a virtual address indicated by the node. The address of the node is used for communication about a data flow graph parameter.

Size: A size is, for example, a size of a data flow graph parameter mentioned in this application document or a message size. The size indicates storage space occupied by data or a message, namely, a data amount included in the data or the message. Usually, a byte is used as a unit, for example, 2 KB and 0.5 MB.

With reference to FIG. 1, an example is provided below to describe how a data flow graph, a node, an edge, and a data flow graph parameter are used to express computational logic. FIG. 1 is a data flow graph. The data flow graph is used to express computational logic of "multiplying a sum of two numbers by a third number to obtain a result", and the computational logic may be expressed as a formula $E=(A+B)\times D$. The data flow graph has five nodes A, B, C, D, and E, and four edges a, b, c, and d. When the data flow graph is defined, the nodes A, B, and D each represent a variable, and the nodes C and E respectively represent an addition operation and a multiplication operation. The edges a and b represent that two addends of the addition operation in the node C are from the nodes A and B, and the edges c and d represent that two factors of the multiplication operation in the node E are from the nodes C and D.

When the data flow graph is run, the nodes A, B, and D represent storage locations of input variables, the node C represents a storage location of a result of the addition operation, and E represents a storage location of a result of the multiplication operation. A storage location represented by a node may be mapped to an address that is used to store data and that is in a physical device such as a hard disk, a memory, or a CPU register. The edges a and b represent a process in which data at storage locations to which the nodes A and B are mapped is transmitted to a storage location to which the node C is mapped, and the edges c and d represent a process in which data at storage locations to which the nodes C and D are mapped is transmitted to a storage location to which the node E is mapped. Data transmission processes represented by these edges may be mapped to a intra-process memory copy process. For example, storage locations indicated by the nodes connected by the edges are in a same host. Certainly, the data transmission processes represented by these edges may alternatively be mapped to an inter-process network-based data communication process. For example, the nodes connected by the edges are distributed in a distributed system. For example, as shown in the figure, if 1 is input to A, 3 is input to B, and 5 is input to D, a value transmitted on the edge a is 1, a value transmitted on the edge b is 3, and a value transmitted on the edge d is 5. In this case, a value obtained in C is 4, a value transmitted on the edge c is 4, and a value obtained in E is 20. This data flow graph represents a computation: (1+3)×5=20.

It should be understood that a computing platform in this application may be deployed on one or more computing nodes. The computing node may be a physical machine or a virtual machine. In other words, the computing platform in this application is also applicable to the virtual machine field. The physical machine may be a server or some terminals having a computing capability, for example, a personal computer or a notebook computer. This is not limited in this application. In this application, computation of a data flow graph is used as an example for description. One or more processes may be run on each computing node, to perform an operation on a subgraph or a copy of the data flow graph. An example is provided below to describe software and hardware running environments of a computing platform. It should be understood that the computing node and a node in the data flow graph have different technical meanings. A user loads, onto the computing platform, a data flow graph that needs to be computed, and computes the data flow graph by using the computing platform.

An application scenario of this application is software that is run on one or more computing nodes and that supports a distributed computing platform. For example, the computing platform may be a machine learning platform. For another example, the machine learning platform may be a deep learning platform used to perform machine learning on a multi-layer neural network. To be specific, a computing task in this application is run across devices. Crossing devices means that program code of the data flow graph is distributed in a plurality of computing devices of one or more servers for execution. The computing device herein may be a CPU, or may be a GPU, an FPGA, a MIC, or another hardware device having a computing capability. This type of platform software includes but is not limited to TensorFlow, MXNet, CNTK, and the like.

It should be understood that, in the foregoing scenario in which computing platform software is run across devices, the data flow graph that needs to be computed may be divided into a plurality of subgraphs (each subgraph may be a part of the data flow graph), or a plurality of copies of the data flow graph are distributed on a plurality of devices.

Figure 2:
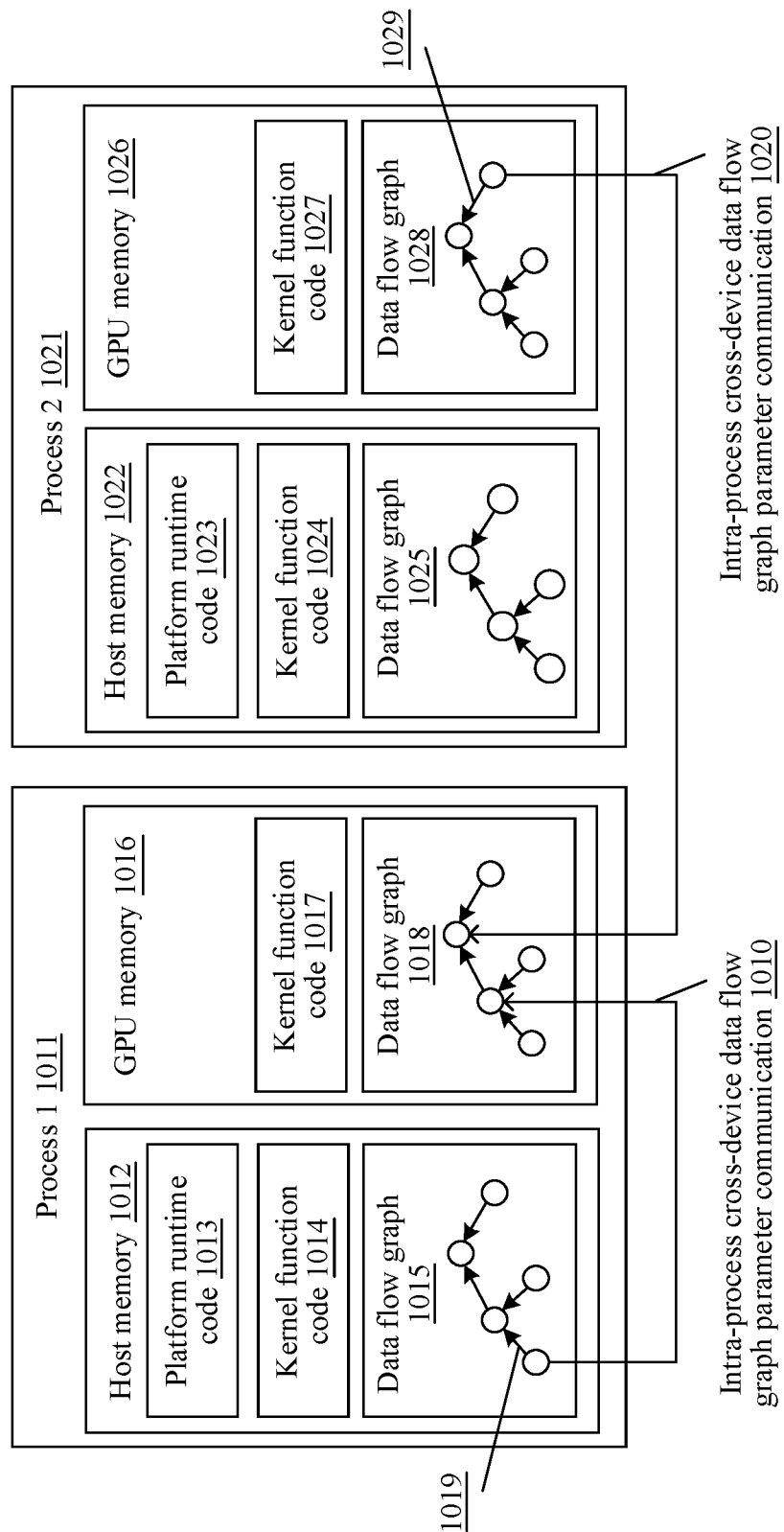
FIG. 2 is a schematic diagram of a computing platform according to one embodiment.

On a computing platform, a plurality of copies or subgraphs of a data flow graph are computed by a plurality of processes. For example, one process computes one subgraph or copy, or one process computes subgraphs or copies that are on a plurality of devices and that are on one physical machine, or subgraphs or copies that are on a plurality of devices and that are on one physical machine are computed by two or more processes. FIG. 2 describes, from a perspective of a process, software and hardware resources of a computing platform corresponding to the process. Two processes in the computing platform that are used to compute a data flow graph are used as an example for description. In the example in FIG. 2, whether the two processes are on a same computing node is not limited, and one process may compute subgraphs or copies for a plurality of devices on one physical machine.

A process 1, namely, 1011 shown in FIG. 2 uses a host memory 1012 and a GPU memory 1016 when computing the data flow graph. A process 2, namely, 1021 uses a host memory 1022 and a GPU memory 1026 when computing the data flow graph. The host memories 1012 and 1022 may be host memories in a same physical machine or different physical machines. The GPU memories 1016 and 1026 may be GPU memories in different physical machines or different GPU memories in a same physical machine. It should be understood that, when the host memories 1012 and 1022 are host memories in a same physical machine, it represents that memory address spaces in the host memory that are separately allocated to the process 1 and the process 2 represent different address segments. Platform runtime code 1013 and platform runtime code 1023 are loaded into the host memories 1012 and 1022 for running. The platform runtime code is code of a system of the computing platform, and is used to run a software environment of the computing platform. A user cannot edit the code. Kernel function code in FIG. 2 is loaded, for running, into a host memory and a GPU memory that correspond to a process. The kernel function code is used to implement a plurality of kernel functions for expressing local computational logic, and may be understood as a kernel function library including the plurality of kernel functions. The kernel function is used to represent some relatively complex logical operation rules, and may be invoked by a node in the data flow graph. For example, the kernel function may be a matrix operation such as point multiplication or vector multiplication, or a convolution operation. These operations need to be implemented by using a relatively complex segment of instructions. In one embodiment, a same kernel function is deployed in memories of devices of a same category (devices of a same model, where GPUs of different models are not the devices of a same category, a GPU and a CPU are also not devices of a same category), and different kernel functions are deployed in different categories of devices. For different types of devices, a same type of kernel function may be deployed in the different types of devices. For example, kernel functions A, B, and C are deployed in a GPU memory, kernel functions B, C, and D are deployed in another CPU memory, and so on. In other words, a kernel function may be deployed in a plurality of devices. How to deploy the kernel function is determined by the computing platform. For example, the kernel function may be written into a library of the computing platform. Details are not described in this application document. However, when performing computation by using resources of the computing platform, the user dynamically schedules kernel functions in different devices based on a load status of the different devices and a distribution of the data flow graph.

In addition, copies or subgraphs of the data flow graph are separately loaded into a host and a GPU memory for storage. In FIG. 2, a circle in the data flow graph represents a node, and a short line with an arrow between circles represents a connection edge, a circle from which the short line starts (a circle to which one end without the arrow of the short line connects) represents a source node of the connection edge, and a circle to which the arrow of the short line points is a destination node of the connection edge. The source node and the destination node each may point to a physical address or a virtual address in any host memory or GPU memory.

FIG. 2 is described as follows: Kernel function code 1014 is run in the host memory 1012 and a data flow graph 1015 is stored in the host memory 1012; kernel function code 1024 is run in the host memory 1022 and a data flow graph 1025 is stored in the host memory 1022; kernel function code 1017 is run in the GPU memory 1016 and a data flow graph 1018 is stored in the GPU memory 1016; and kernel function code 1027 is run in the GPU memory 1026 and a data flow graph 1028 is stored in the GPU memory 1026. The data flow graphs 1015, 1018, 1028, and 1025 are copies of a same data flow graph. For example, an address recorded in a source node of a connection edge 1019 points to an address in the host memory 1012 used by the process 1 (namely, 1011), and an address recorded in a destination node points to an address in the GPU memory 1016 used by the process 1 (1011). Therefore, intra-process cross-device data flow graph parameter communication 1010 needs to be performed in a computation process of the edge from the source node to the destination node. For another example, an address recorded in a source node of a connection edge 1029 points to an address in the GPU memory 1016 used by the process 1 (namely, 1011), and an address recorded in a destination node points to an address in the GPU memory 1026 used by the process 2 (namely, 1021). Therefore, inter-process cross-device data flow graph parameter communication 1020 needs to be performed in a computation process of the edge from the source node to the destination node. If the process 1 and the process 2 are located in different hosts, the inter-process cross-device data flow graph parameter communication 1020 is cross-physical machine communication.

Figure 3:
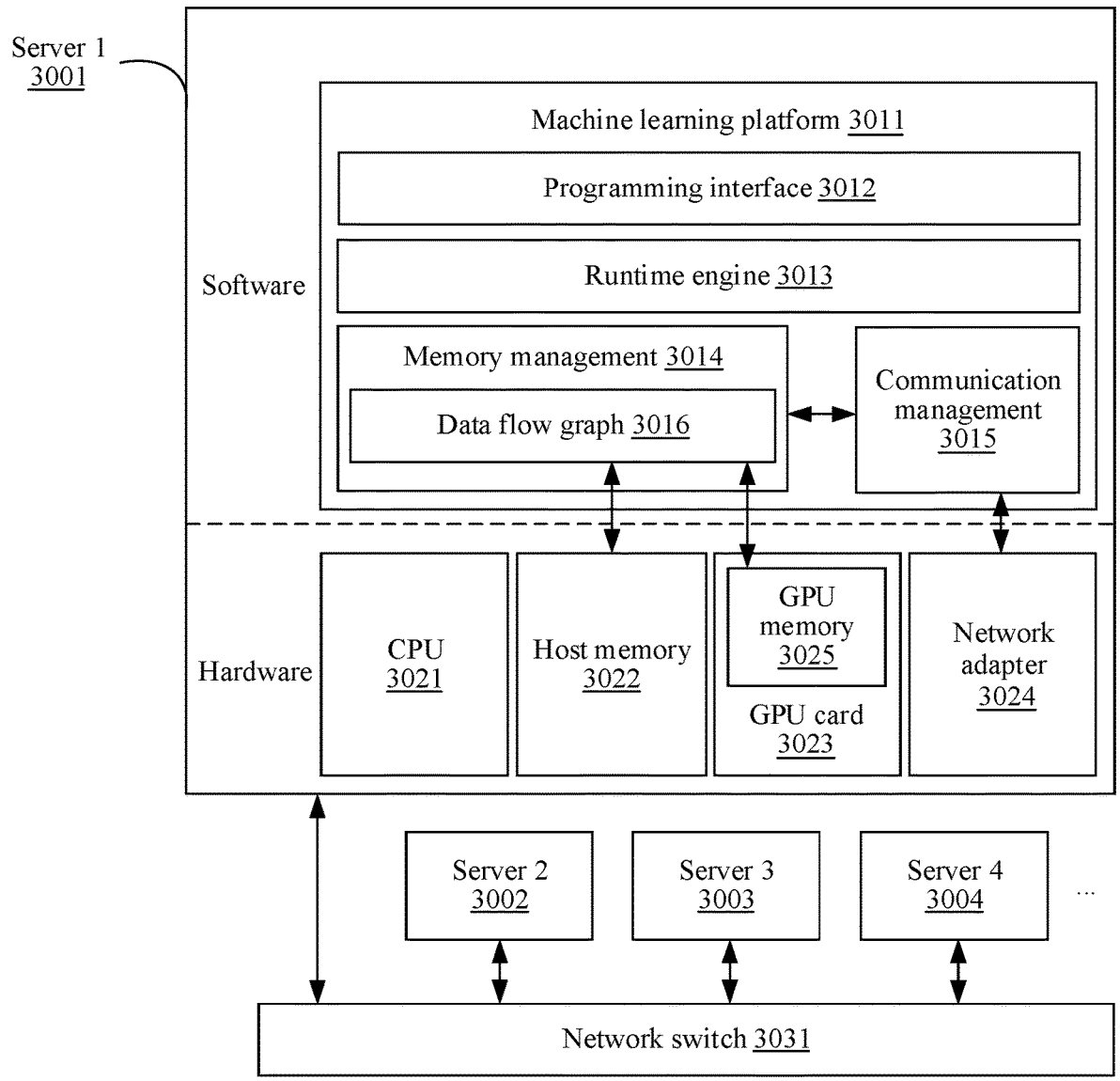
FIG. 3 is a schematic diagram of a network architecture of a distributed computing platform according to one embodiment.

A software running environment and a hardware architecture in this application are further described below with reference to FIG. 3. In FIG. 3, a machine learning platform 3011 is used as an example. The machine learning platform (namely, 3011) is run on a server 1 (namely, 3001), a server 2 (namely, 3002), a server 3 (namely, 3003), and a server 4 (namely, 3004). The four servers, the server 1 to the server 4, communicate with each other by using a network switch 3031. Using the server 1 as an example, software and hardware included in the server are shown in detail. In terms of the hardware, a CPU (for example, 3021 in the server 1), a host memory (for example, 3022 in the server 1), and a network adapter (for example, 3024 in the server 1) are installed in each of the server 1 to the server 4. The server may include a GPU card (for example, 3023 in the server 1). A GPU memory (for example, 3025 in the server 1) is packaged in the GPU card. In terms of the software, machine learning platform software (for example, 3011 in the server 1) is deployed in the server 1 to the server 4. The software includes a programming interface (for example, 3012 in the server 1), a runtime engine (for example, 3013 in the server 1), a memory management module (for example, 3014 in the server 1), a communication management module (for example, 3015 in the server 1), and the like. A parameter in a data flow graph (for example, 3016 in the server 1) managed by the memory management module (for example, 3014 in the server 1) is stored in the host memory (for example, 3022 in the server 1), and some parameters may be stored in the GPU memory (for example, 3025 in the server 1). The memory management module 3014 reads the data flow graph 3016 stored in the host memory 3022 or the GPU memory 3025, to perform computation. In a computation process, if communication about the data flow graph parameter needs to be performed with another server, the communication management module (for example, 3015 in the server 1) and the network adapter (for example, 3024 in the server 1) may be used to receive and send data. It should be understood that the machine learning platform 3011 is run by using a process in the server 1, and the programming interface, the runtime engine, memory management, and the like may be considered as several segments of code with different functions.

It should be understood that the machine learning platform is equivalent to an operating system running on computer hardware, or similar to another operating system, the machine learning platform may be divided into an application layer and a core layer. The application layer may be used by a user to edit or input data, and an interface is provided between the application layer and the core layer, so that the interface is invoked by using an instruction or a function edited by the user, to perform the instruction or the function by using the core layer.

It should be understood that the host memory is a CPU memory that may be used by a process used to compute a data flow graph. Therefore, even if the process is located on a virtual machine or a container, a memory, for example, a virtual CPU memory, allocated to the process may also be referred to as a host memory in this application.

In a scenario in this application, it is required that collaborative execution can be performed across devices on a plurality of subgraphs or a plurality of copies of a data flow graph. To be specific, collaborative execution is performed by a plurality of processes in one or more servers, or collaborative execution is performed by a CPU and accelerator hardware that are managed by a same process in a same server. However, a data flow graph parameter is inevitably exchanged to compute the data flow graph across devices. A currently used parameter exchange method cannot meet a requirement of the machine learning platform for computing efficiency.

In addition, a message passing (MP) mechanism represented by a message passing interface (MPI) technology is used for high-performance computing (HPC). The MPI technology includes a protocol and a semantic description. Parameter transmission efficiency is relatively high in this mechanism. High-performance computing is a large amount of complex computing performed by using an ultra-large electronic computer, such as a biological heritage gene assay, missile trajectory computation, nuclear reactor simulation, aircraft trajectory computation in the aerospace field, and star orbit computation in the celestial observation field. Performance of hardware of a computer, such as a supercomputer, used for these computations is much higher than that of a computer in a general civil or commercial scenario. The supercomputer is an ultra-large electronic computer, and has a strong data computing and processing capability. The supercomputer is mainly characterized by a high speed and a large capacity, and is provided with a plurality of external and peripheral devices and rich high-function software systems. Most existing supercomputers may reach an operational speed of at least one trillion times per second. For ease of understanding of a difference between a supercomputer in the high-performance computing field and a server used in another field, an example is used below for description. Some manufacturers have the following specifications: A computer whose average operational speed is at least 10 million times per second and whose storage capacity is at least 10 million bits belongs to the supercomputer, for example, ILLIAC IV in America, NEC in Japan, Eugene in Europe, and the computer "Galaxy" in China, and for another example, a supercomputer applicable to a modern cluster architecture, for example, Blue Gene in America, "Kyo" in Japan, Piz Daint in Europe, and "Sunway" and "Tianjin" in China. If the supercomputer is applied to a distributed scenario as a computing node, a high-performance communications network (referred to as a high-performance network below) is used between computing nodes. For example, a dedicated network device (such as a router, a network adapter, a network cable, or a switch) is used in an infinite bandwidth InfiniBand technology, and a cost of the dedicated network device is several times greater than that of a same type of device used by an enterprise (for example, a price of a router used for InfiniBand is four times greater than that of a common router). A common TCP/IP protocol or Ethernet transmission protocol is run on such type of dedicated network device, and a high-performance communications network such as InfiniBand may also be used between common commercial or civil servers. However, a payload is relatively low, and performance (for example, bandwidth and a throughput) of such type of dedicated network device cannot be fully exerted. Therefore, in the high-performance communications field, such type of dedicated network device and the supercomputer usually transmit data by using a dedicated communications protocol. For example, in the high-performance communications field, data transmission is performed by using the MPI technology. In terms of a device, this may be represented as a case in which an MPI library is loaded into the device.

It should be noted that an MPI library is an MPI development library, and includes a plurality of MPI interface functions (also referred to as MPI instructions or MPI primitives) and an MPI communications protocol. From a perspective of a software architecture, an MPI interface function may be understood as an interface between the application layer and the core layer. In a software architecture in which a TCP/IP technology is used, the MPI interface function is equivalent to a socket interface function (namely, a socket).

In one embodiment, an interface function in the MPI function library is used to transmit data. In this transmission process, a source process is a process that is on a transmit end physical machine and that sends data by using a sending primitive, and a destination process is a process that is on a receive end physical machine and that receives the data by using a receiving primitive. The sending primitive and the receiving primitive in the MPI function library are used in a pair. For two processes in communication, a source process sends data to a destination process by using a sending primitive, and the destination process processes the data by using a receiving primitive. Interface parameters of the pair of primitives carry a same message size and a same message tag. In addition, an interface parameter of the sending primitive further carries an identifier of the destination process. The information about the destination process is used to indicate the destination process, for example, may be a sequence number of the destination process; or information in another form may be used to identify the destination process. This is not limited in this application. However, an interface parameter of the receiving primitive further carries an identifier of the source process. The identifier of the source process is used to identify the source process, for example, may be a sequence number of the source process; or information in another form may be used to identify the source process. This is not limited in this application.

It should be understood that in the MPI library, a unique process sequence number (for example, a rank mentioned below) may be assigned to a process that may perform communication. However, the host may maintain a mapping relationship between a process sequence number in the MPI library and a physical machine on which a process is located, a mapping relationship between a process sequence number and information about a device corresponding to a process, or a mapping relationship among a process sequence number, a physical machine on which a process is located, and a device corresponding to a process. In this way, it can be learned whether processes that perform communication are on a same physical machine or use a same device, so that the MPI sending primitive can be sent by using a network adapter, a shared memory, a local loopback network device (namely, a kernel virtual device), or the like. A manner selected for sending the MPI primitive is related to whether the source process and the destination process are on a same physical host or in a same data center (DC), and is also related to a network communications technology (for example, a high-performance network or the Ethernet) used between communications processes. Details are not described in this application.

The MPI library may work with an RDMA (Remote Direct Memory Access) technology. When a CPU of a host on which the destination process is located does not execute the receiving primitive, the source process may write, by using the sending primitive, data and related information of the data (for example, a triplet mentioned below) into an MPI buffer of the host on which the destination process is located. Certainly, the TCP/IP protocol may also be used for the MPI library. Therefore, the host on which the destination process is located may receive data from the source process by using an I/O (Input/Output) device, and write the related information of the data (the triplet mentioned below) into the MPI buffer of the host in which the destination process is located, so that the data is written into the MPI buffer of the host in a process of executing the receiving primitive by the destination process. That the MPI technology is used in cooperation with different communications protocols belongs to different application scenarios in the technical solutions recorded in this application. This is not limited in this application. However, in a scenario in which the MPI technology works with different communications protocols to perform data transmission, how the MPI primitive works in a process of implementing data transmission such as data sending or data receiving belongs to an internal running mechanism of the MPI library, and reference is made to related technical documentations and descriptions of MPI libraries of different versions. Details are not described in this application.

In the MPI technology, a host memory that uses the MPI library includes an address space that is specially used to store data processed by using the MPI primitive, and the address space is referred to as an MPI buffer. The MPI buffer usually has a fixed size as defined, such as 64 KB or 1 MB. It should be understood that data that needs to be transmitted by using the sending primitive may be less than a buffer size or may be greater than a buffer size. When the data that needs to be transmitted is greater than the buffer size, the source process may split, in a process of executing the sending primitive, the data that needs to be transmitted. However, when an MPI buffer corresponding to the destination process is fully occupied, the sending primitive cannot be used to continue to write data into the MPI buffer of the destination process. In this case, the destination process needs to execute the receiving primitive, to write received data into a destination address of the data. For example, the destination address may be in a GPU chip, memory space used by a user (memory space that is in the host memory and that is allocated by a system to a user to store data of the user), and another memory device. The destination process executes the receiving primitive to receive data. This receiving process may include: detecting, by using the receiving primitive, data that is sent by the source process and that is written into the MPI buffer of the host on which the destination process is located, and storing, from the MPI buffer, data transmitted by the source process into the destination address (for example, the host memory or the GPU memory) of the data. In this way, the destination process can use the data.

Table 1 describes common MPI interface functions.

TABLE 1

| Primitive type | Interface function | Semantics |
| --- | --- | --- |
| Sending primitive | MPI_Send | Synchronous sending |
| | MPI_Isend | Asynchronous sending |
| Receiving primitive | MPI_Recv | Synchronous receiving |
| | MPI_Irecv | Asynchronous receiving |
| Probe primitive | MPI_Probe | Synchronous detection |
| | MPI_Iprobe | Asynchronous detection |
| Wait primitive | MPI_Wait | Waiting |

For example, the wait primitive in Table 1 is used to wait for completion of execution of a primitive. Table 1 merely shows examples of several primitives for description. For example, the sending primitive may further include an MPI interface function, in another form, that can implement a function of sending information, and the sending primitive may further include an MPI interface function, in another form, that can implement a function of receiving information.

To improve data (data is mainly a data flow graph parameter) transmission performance of a machine learning platform in a distributed network environment, the industry currently starts to attempt to apply an MPI communications technology in the high-performance computing field to a computing platform, for example, to a TensorFlow-Allreduce project developed by Baidu mentioned below. However, because a hardware condition of the computing platform is different from that in the high-performance computing field, existing application of the MPI technology to the computing platform affects data transmission performance. Similarly, computing efficiency of the computing platform is greatly limited.

A solution proposed in the TensorFlow-Allreduce project developed by Baidu is briefly described below with reference to FIG. 4. In the project, a machine learning platform is distributed in a distributed system. In a technical solution of the project, a message passing primitive of an MPI library is used on a machine learning platform, to establish aggregated communication in which all processes jointly participate, and complete, in an aggregated communication process, reduction computation and parameter distribution of a data flow graph parameter in computation of a data flow graph. Therefore, communication performance of the data flow graph parameter can be improved in a high-performance network environment such as InfiniBand. An aggregated communication step is a communication step in which a plurality of processes simultaneously participates and that includes reduction computation. In the reduction computation, the plurality of processes exchange parameters. For example, maximizing, minimizing, or averaging is a type of reduction computation. Using averaging as an example, the plurality of processes each may read some to-be-averaged values, and the plurality of processes that need to participate in computation send respective data to a process that executes an averaging algorithm. In other words, inter-process parameter communication needs. However, it is clearly that the reduction computation is a common algorithm in machine learning. Therefore, the data flow graph parameter may be transmitted through aggregated communication.

Figure 4:
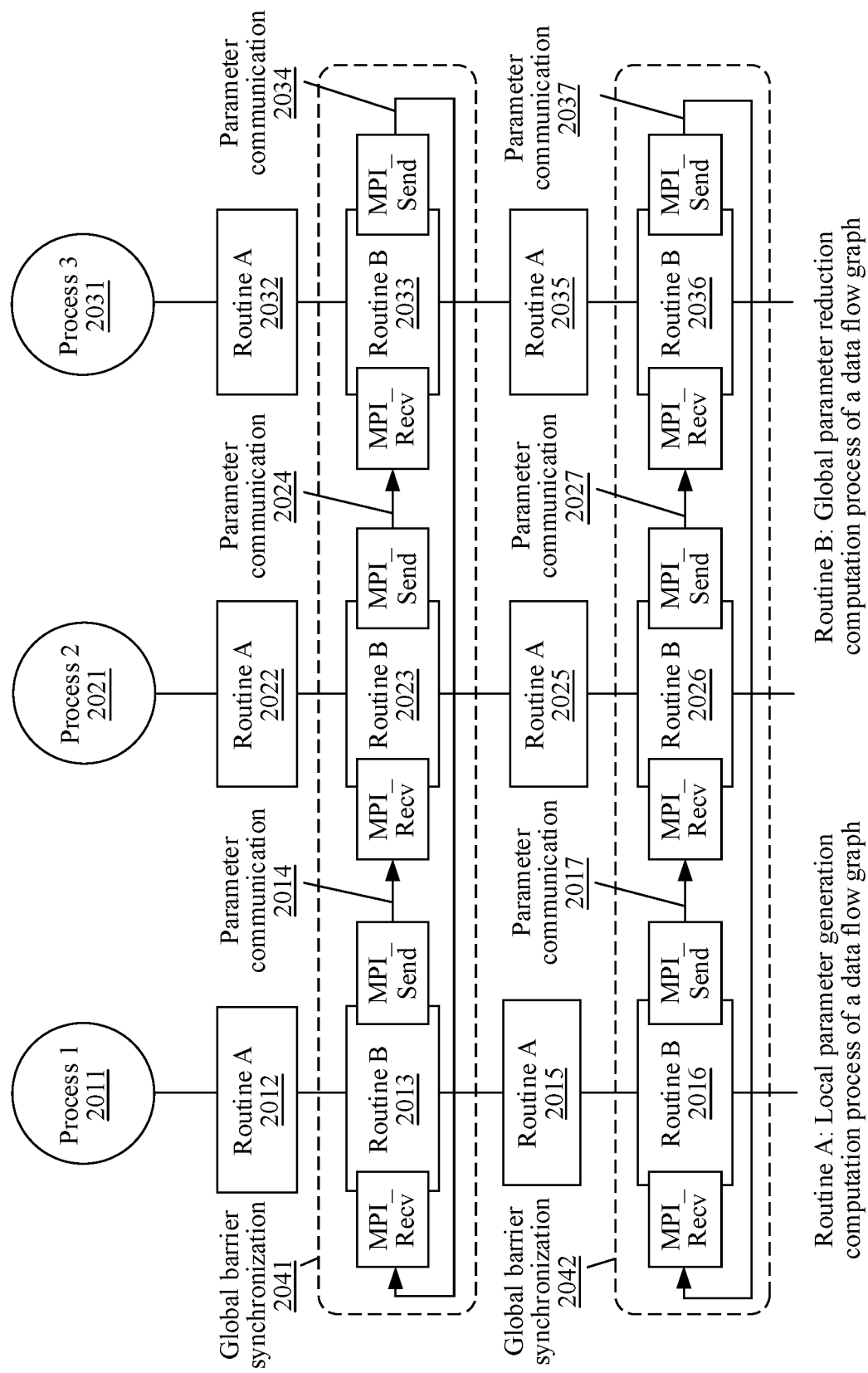
FIG. 4 is a time sequence diagram of a method for performing inter-process communication by using an MPI technology according to one embodiment.

FIG. 4 is a time sequence diagram of the technical solution during running. In this solution, all processes (2011, 2021, and 2031) participating in computation of a data flow graph each are configured to run a subgraph or a copy. Each process executes two routines cyclically and repeatedly. The routine is a group of function sets and can be used to perform a specific function. For example, a routine is used in a system to provide an external interface or service. For example, an API, a service, and the like of an operating system are routines. A standard function, a library function, and the like provided by Delphi or C++Builder are also routines. A routine A (2012, 2015, 2022, 2025, 2032, and 2035 in the figure each are a routine A) performs local parameter generation computation for the data flow graph. A routine B (2013, 2016, 2023, 2026, 2033, and 2036 in the figure each are a routine B) performs global parameter reduction computation for the data flow graph. An embodiment of the routine B is parameter communication (2014, 2017, 2024, 2027, 2034, and 2037) performed based on MPI_Send and MPI_Recv primitives. Receiving and sending chains for the parameter communication form a circle, so that a reduction computation result of each process can finally reach all other processes. Therefore, a global data flow graph parameter collection and distribution process is completed. This aggregated communication process forms one-time global barrier synchronization (global barrier synchronization) (2041 and 2042). In other words, it needs to be ensured that all processes perform a global parameter reduction computation when performing a same round of iteration. To be specific, after completing a same round of computation, all the processes enter a next round of iteration. 2041 and 2042 represent two rounds of iterative processes. In one embodiment, with reference to FIG. 1, the global barrier synchronization may mean that a process that first arrives at the routine B is finally completed until another process also arrives at the routine B. For example, an identifier or an instruction may be set in code, so that when executing the identifier or the instruction, each process detects whether the another process also executes the same identifier or instruction. When all processes execute the same identifier or instruction, a next instruction continues to be executed.

It should be noted that, in this solution, before the parameter communication is performed by using an MPI primitive in FIG. 4, a source process and a destination process that participate in the communication need to first interact with each other to obtain information about a communication peer side. If the source process and the destination process that participate in communication do not first interact with each other to obtain information about a communication peer side end, data cannot be transmitted by using the MPI primitive.

However, a communication time sequence of a computing platform represented by TensorFlow is dynamic and random, and information such as a source/destination and a size of a message to be processed by using a communication primitive can be known only during running. In addition, in a communications technology used for an existing machine learning platform, a source process and a destination process do not need to use a primitive and an interface parameter that are paired. However, in a message passing mechanism represented by an MPI library, interface parameters such as a message source or destination and a message size need to be specified for a communication primitive during programming development, and interface parameters that are paired with primitives of receiving and sending parties are tightly coupled. This conflict is not resolved in the TensorFlow-Allreduce solution. In the TensorFlow-Allreduce solution, a group of programming interfaces is added, and the added interface is used to program the solution. Several instructions used for aggregated communication are developed, and an MPI interface is encapsulated in the instructions. A programming habit of TensorFlow is changed to adapt to a requirement of the MPI library. In this case, a user needs to learn to use a development library interface provided in this solution and re-write and edit application code, so that a performance advantage brought by message passing communication can be obtained. Therefore, usability and commonality of this solution are insufficient. More importantly, because the communication time sequence of the computing platform is dynamic and random, it is difficult for both parties of data communication to determine a peer end and perform negotiation in a timely manner. This negotiation process also increases data communication load on the computing platform. Consequently, data transmission efficiency is affected.

In addition, in the message passing mechanism represented by the MPI library ordered and synchronous operations are mainly performed during communication, and a proper quantity of message transmission and asynchronous operations that are unpaired are allowed with assistance of an intra-library buffer mechanism. However, on a machine learning and deep learning platform represented by TensorFlow, because synchronization is not required in a computation process, communication time sequences thereof are also out of order and asynchronous, a large quantity of random communication operations are performed alternately, and it is not required that all processes are in a same round of iteration during computation. This conflict is not resolved in the TensorFlow-Allreduce solution. In the TensorFlow-Allreduce solution, global barrier synchronization is selected and used between rounds of computation iterations of the TensorFlow, to avoid performing communication alternately across rounds, and impose a constraint on the MPI library. In this way, a process with a relatively high computing speed frequently enter a waiting state, and consequently, computing resources are wasted. The performance advantage of the message passing communication may be reduced or eliminated due to time overheads of synchronous waiting, so that an overall computing speed of the entire machine learning platform depends on a slowest process. Consequently, the computing speed of the machine learning platform is affected.

The TensorFlow-Allreduce solution of Baidu is not improved in an original TensorFlow system, but is a development library packaged outside the original TensorFlow system. The development library is an external function library, is relatively independent, and is connected to a system by using an external extended interface of the TensorFlow system. A transmission mode (namely, Allreduce) that is provided by the development library and that uses integrated communication is another group of communications interfaces that are parallel with interfaces provided by the original TensorFlow system. In the external function library, core layer code of the TensorFlow platform is not modified. The TensorFlow-Allreduce solution is a set of independent code, and the set of code is used to invoke, from the outside of the TensorFlow platform, an application programming interface (API) provided by the TensorFlow platform. It should be understood that the machine learning platform may also be divided into an application layer and a core layer. The application layer is configured to: receive a model entered by a user, and to-be-trained or to-be-learned data, run an algorithm, code, or the like compiled by the user. However, it may be considered that all modules such as the runtime engine 3013, the memory management 3014, and the communication management 3015 described above in FIG. 3 may be located at the core layer. For the development library, whether a physical location to which a source address or a destination address of a to-be-communicated data flow graph parameter points is a host memory or a GPU memory cannot be determined. The TensorFlow system shields the development library from the information. It is required that for a used MPI library, the physical location of the source or destination address of the data flow graph parameter can be sensed, so that the data can be read and written correctly by using an external mechanism.

In the TensorFlow-Allreduce solution, a CUDA (Compute Unified Device Architecture)-aware MPI library is used. If the MPI library works with a GPU that can support a CUDA programming interface, for example, an NVIDIA GPU, a sending primitive of the MPI library may be used to determine a memory in which a source address of information to be processed by using the sending primitive is located, a receiving primitive of the MPI library may be used to determine a memory in which a destination address of information to be processed by the receiving primitive is located. For example, if to-be-sent data is located in the GPU memory, the sending primitive of the MPI library is used to send data located in the GPU memory after the data is copied into a corresponding host memory. However, in fact, not all MPI libraries are CUDA-aware. This limits selection of the MPI library when the MPI technology is applied to the machine learning platform.

In addition, at core layers of a plurality of machine learning platforms including the TensorFlow, a non-thread secure CUDA driver layer interface is usually invoked to access a GPU memory. In this case, when the CUDA-aware MPI library is used on a machine learning platform such as TensorFlow that uses a CUDA interface, resources are mutually preempted. Consequently, there is a performance disadvantage. It can be learned that, the MPI library and the platform such as TensorFlow access the GPU memory by using a same mechanism, while at core layers of the MPI library and the TensorFlow platform, different threads are used to access the GPU memory. In addition, a plurality of threads cannot concurrently access the GPU memory. To be specific, when one thread occupies a CUDA driver layer interface, another thread cannot use the interface, and consequently, cannot access the GPU memory. Therefore, some scheduling schemes are required, so that a plurality of threads can access the GPU memory, for example, by using a mutual exclusion lock or a flow synchronization mechanism. Because the solution of Baidu is an external function library, a subfunction relationship and an invoking process that are used in a process of performing a function cannot be sensed. For example, a sending primitive and a receiving primitive of an MPI function library that are used in the solution of Baidu, if transmitted data is located in the GPU memory, a thread executing the sending primitive or the receiving primitive is locked in an entire process of executing the primitive. Alternatively, on the computing platform, a sending primitive or a receiving primitive is used as an instruction managed by using the flow synchronization mechanism. However, a process of executing the sending primitive or the receiving primitive actually includes a plurality of subprocesses, and the GPU memory does not need to be accessed in all the subprocesses. This causes extra waiting time overheads, and affects message passing efficiency. Using the sending primitive as an example, a process of executing the sending primitive includes a plurality of subprocesses such as dividing data, inserting a pointer, and copying a memory. The GPU memory needs to be accessed only when the memory is copied.

This application provides a data transmission method in a distributed system, to simplify a communication process when an MPI technology is applied to computation of a data flow graph. The method may be implemented by using software code. The code is included in computing platform software, and is deployed in the distributed computing system. An example in which the data flow graph is an object computed on a computing platform, and a data flow graph parameter is transmitted in a computation process is used below for description. In this application, the computing object on the computing platform is not limited, and a type of data transmitted in the computation process is not limited either. A plurality of physical machines on which the computing platform is deployed store a copy or a subgraph of a to-be-trained data flow graph, and the distributed computing system includes a first computing node and a second computing node. In an embodiment corresponding to FIG. 5, the first computing node and the second computing node are different computing nodes. During running, program code in the present disclosure is run in a host memory of a server or in the host memory and a GPU memory. Description is provided below with reference to FIG. 5. It should be understood that, unless otherwise stated, numbers S501 to S508 below do not represent an execution sequence of the steps. For example, an execution sequence of S501 and S502 is not specified.

S501: The first computing node generates a first triplet based on a name, a size, and a communication peer side identifier of a first data flow graph parameter in a first graph data structure according to a first interface parameter generation algorithm. The first triplet includes a message tag, a message size, and a destination process sequence number. The message tag corresponds to the name of the first data flow graph parameter, the message size corresponds to the size of the first data flow graph parameter, and the destination process sequence number corresponds to a process that is on the second computing node and that receives the first data flow graph parameter.

The first graph data structure in the first computing node stores the name, the size, and the communication peer side identifier of the first data flow graph parameter in the first data flow graph. The first data flow graph parameter is a parameter carried byon a connection edge of the first data flow graph. The communication peer side identifier of the first data flow graph parameter in the first data flow graph corresponds to the second computing node.

The first graph data structure may be different on different computing platforms. This is not limited in this application. For example, the first graph data structure may be a Tenser data structure in a TensorFlow platform. It can be learned that in the first data flow graph and the second data flow graph, the first data flow graph parameter is recorded as a data flow graph parameter transmitted from the first computing node to the second computing node.

The name of the first data flow graph parameter is used to identify the first data flow graph parameter, and may be a field in the first graph data structure or may be information distributed in the first graph data structure. In other words, the name of the first data flow graph parameter may be obtained by analyzing the information in the first graph data structure. Specific embodiments are different on the different computing platforms. For example, in TensorFlow, reference may be made to the following related paragraphs in this application.

The size of the first data flow graph parameter is used to indicate storage space occupied by the first data flow graph parameter, namely, a data amount of the data flow graph parameter. The size of the first data flow graph parameter may be obtained by using a field in the first graph data structure. For example, a value of the size of the data flow graph parameter is recorded in a unit of byte, for example, 3000 or 4000. Alternatively, the size of the first data flow graph parameter may be represented by using information distributed in the first graph data structure. For example, in the parameter of the first graph data structure, a part of the data amount of the first data flow graph parameter is identified in a plurality of substructures, and the size of the first data flow graph parameter may be obtained through computation based on the information.

The communication peer side identifier of the first data flow graph parameter in the first data flow graph may be an identifier of the second computing node; an identifier of a storage device in which a destination address of the first data flow graph parameter is located, where the storage device is located on the second computing node; an identifier of a process that is on the second computing node and that receives the first data flow graph parameter; or other information used to indicate a receive end of the first data flow graph parameter. This is not limited in this application.

In conclusion, that the first graph data structure in the first computing node stores the name, the size, and the communication peer side identifier of the first data flow graph parameter in the first data flow graph may be that the first graph data structure includes fields that carry the three types of information, or may be that the first graph data structure stores information that can be used to obtain the name, the size, or the communication peer side identifier of the first data flow graph parameter. To be specific, the "storing" may be directly reading the name, the size, and the communication peer side identifier of the first data flow graph parameter from the first graph data structure, or may be obtaining the name, the size, and the communication peer side identifier of the first data flow graph parameter by analyzing the information in the first graph data structure.

Certainly, the first data flow graph parameter may also be stored in one or more data structures on the first computing node.

For example, on the TensorFlow platform, S501 and S503 may be implemented by adding a meta information management module (which may be specifically adding a segment of code) to memory management modules (for example, 3014 in FIG. 3) on the first computing node and the second computing node. The meta information management module may store, in the data structure, information about data flow graph parameters in edges of data flow graphs on the first computing node and the second computing node. The data structure includes names, sizes, and communication peer side identifiers of the data flow graph parameters.

In addition, it should be understood that, on a general machine learning platform, due to out-of-order and random communication, a process executes operations corresponding to various primitives. To be specific, a process may execute both a send operation and a receive operation. In most cases, there is no process specially executing a sending primitive or a receiving primitive.

S503: The second computing node generates a second triplet based on the name, the size, and a communication peer side identifier of the first data flow graph parameter in the second graph data structure according to a second interface parameter generation algorithm, where the second interface parameter generation algorithm is the same as the first interface parameter generation algorithm, the second triplet includes the message tag, the message size, and a source process sequence number, and the source process sequence number corresponds to a process that is on the first computing node and that sends the first data flow graph parameter.

The second graph data structure in the second computing node stores the name, the size, and the communication peer side identifier of the first data flow graph parameter in the second data flow graph. The communication peer side identifier of the first data flow graph parameter in the second data flow graph corresponds to the first computing node.

The second data flow graph is stored in the second computing node. The second data flow graph may be a copy of the first data flow graph. Alternatively, the second data flow graph and the first data flow graph may be two subgraphs of a data flow graph. For descriptions of the name, the size, and the communication peer side identifier of the first data flow graph parameter in the second data flow graph, refer to corresponding parts in S501. Details are not described herein again.

In this way, an interface function parameter required by an MPI sending primitive and an MPI receiving primitive can be obtained without interaction with a communication peer side or a user.

It should be noted that the message tag, the message size, and the source (or destination) process sequence number are usually generated according to different algorithms. To be specific, the first interface parameter generation algorithm includes a first algorithm, a second algorithm, and a third algorithm. The first algorithm, the second algorithm, and the third algorithm may convert information in the first graph data structure and information in the second graph data structure into the foregoing triplets that conform to MPI interface parameter formats.

However, the first interface parameter generation algorithm is the same as the second interface parameter generation algorithm in the foregoing description, indicating that the first interface parameter generation algorithm includes the first algorithm, the second algorithm, and the third algorithm, and the second interface parameter generation algorithm includes a first algorithm, a second algorithm, and a third algorithm that are the same as or correspond to those included in the first interface parameter generation algorithm.

An embodiment of S501 may be: determining the message tag in the first triplet based on the name of the first data flow graph parameter in the first graph data structure according to the first algorithm, determining the message size in the first triplet based on the size of the first data flow graph parameter in the first graph data structure according to the second algorithm, and determining the destination process sequence number in the first triplet based on the communication peer side identifier of the first data flow graph parameter in the first graph data structure according to the third algorithm.

Correspondingly, an embodiment of S503 is: determining the message tag in the second triplet based on the name of the first data flow graph parameter in the second graph data structure according to the first algorithm in the second interface parameter generation algorithm, determining the message size in the second triplet based on the size of the first data flow graph parameter in the second graph data structure according to the second algorithm in the second interface parameter generation algorithm, and determining the source process sequence number in the second triplet based on the communication peer side identifier of the first data flow graph parameter in the second graph data structure according to the third algorithm in the second interface parameter generation algorithm.

The message tag is used to indicate data sent by using the MPI sending primitive. The message tag may be obtained by processing the name of the first data flow graph parameter according to the first algorithm. The first algorithm may be an algorithm for converting any binary length value into a fixed binary length value, for example, may be a hash algorithm, or may be another algorithm that can be used to convert the name of the first data flow graph parameter into a format of a message tag in an interface parameter that conforms to an MPI primitive.

The message size is used to indicate a size of information sent by using the MPI sending primitive. In one embodiment, the second algorithm may be used to enable a value of the message size field to be equal to a parameter value of the size of the data flow graph parameter, namely, the size. In another embodiment, the second algorithm may be used to enable a value of the message size field to be equal to a value plus a parameter value of the size of the data flow graph parameter. The added value is a size of other information to be carried in the sending primitive, for example, a header length of the sending primitive mentioned below. For example, the information sent by using the MPI sending primitive includes to-be-sent data and a header. In this case, a value of the message size is a size of the to-be-sent data plus a size of the header.

The source process sequence number is a sequence number of a process that is on the first computing node and that executes the MPI sending primitive, and the destination process sequence number is a sequence number of a process that is on the second computing node and that executes an MPI receiving primitive corresponding to the MPI sending primitive. It should be understood that because the first data flow graph and the second data flow graph in this application stores a source node and a destination node of the first data flow graph parameter, a storage device corresponding to a source address of the first data flow graph parameter and a storage device corresponding to a destination address of the first data flow graph parameter may be learned, and the source address and the destination address are used to compute a data flow graph (transmission of the data flow graph parameter is a part of computation of the data flow graph) on the computing platform.

The third algorithm is a mapping relationship between a process sequence number and a communication peer side identifier. The first computing node includes a mapping relationship between the destination process sequence number and the communication peer side identifier, and the second computing node includes a mapping relationship between the source process sequence number and the communication peer side identifier. The third algorithm may be a function relationship, or may be a mapping table maintained on a computing node. This is not limited in this application. For embodiments of the first algorithm, the second algorithm, and the third algorithm, refer to the following examples of the TensorFlow platform. The following embodiments may also be used on another computing platform. For descriptions of the process sequence number, refer to the following examples of the TensorFlow platform. The following embodiments may also be used on another computing platform.

It is clearly that, in the foregoing, an MPI sending primitive whose interface parameter is the first triplet corresponds to an MPI receiving primitive whose interface parameter is the second triplet. In this case, the first graph data structure and the second graph data structure include the communication peer side identifiers, to resolve a problem that a process of a communication peer side is unknown in a data flow graph running process. In addition, two communications parties that need to transmit the first data flow graph parameter generate triplets by using respective information in data flow graphs and same interface parameter generation algorithms that are stored in respective computing nodes, without a need to exchange respective information with peer ends, and without a need to negotiate an algorithm for generating the triplets. The method can be independently performed in a data sender and a data receiver, and a corresponding triplet is generated when the two parties do not interact with each other. This simplifies a process of communication performed by using an MPI primitive, and can improve data transmission efficiency on a distributed computing platform.

S505: The first computing node invokes a message passing interface MPI sending primitive by using the first triplet as an interface parameter, to send the first data flow graph parameter to the second computing node.

A concept of a triplet described in this application is only used to represent three parameters in the triplet, but does not limit a sequence of the three parameters. Formats of the three parameters in the triplet meet a format requirement of an interface function parameter carried in the MPI sending primitive. In addition, an interface parameter of the MPI sending primitive includes but is not limited to the first triplet, and an interface parameter of the MPI receiving primitive includes but is not limited to the second triplet.

In one embodiment, the first computing node is configured to read the first data flow graph parameter from a host memory in the first computing node by using the first triplet as the interface parameter and by using the message passing interface MPI sending primitive, to send the first data flow graph parameter to the second computing node.

In one embodiment, the first computing node further stores information about a storage device of the first data flow graph parameter in the first computing node, namely, a memory type of data described below. Before S505, the first computing node performs S504. To be specific, when the information about the storage device indicates another storage device, the first computing node copies the first data flow graph parameter from the another storage device into the host memory in the first computing node. The another storage device is a memory in the first computing node other than the host memory.

The information about the storage device may be an identifier of the storage device, or may be a number used to indicate the storage device. A storage type of the storage device may be determined based on the identifier or the number. Alternatively, the information about the storage device may be information that identifies a type of the storage device, information, in another form, that can be used to implement the foregoing function, or the like. This is not limited in this application. For specific embodiment, refer to the following related paragraphs.

For example, the another storage device may be a GPU memory or a memory of another processing unit, for example, a memory of a processing unit such as an FPGA or a DSP. This step can be understood with reference to the following embodiments of the TensorFlow platform. It may be understood that this step is implemented by the foregoing communication management module of the computing platform by using a mechanism of accessing another storage device by a core layer of the computing platform. For example, for a GPU memory, to-be-sent data may be copied into the host memory by using a function provided by a CUDA programming interface on the platform. In this way, before using the MPI sending primitive, the first computing node prepares the first data flow graph parameter in the host memory in the first computing node, and the MPI sending primitive is used to read the first data flow graph parameter from only the host memory in the first computing node, and does not need to be used to contend against a computing platform for reading of a resource from the another storage device. Therefore, execution efficiency of the MPI sending primitive is improved. In addition, the MPI library can be selected more flexibly, the MPI library does not need to support access to another storage device, and the computing platform and the MPI library do not compete for accessing the another storage device. For a specific discussion, refer to the following related paragraphs. Certainly, if an MPL library supporting access to the GPU memory is selected, this step may alternatively be performed by using the MPI library.

It should be understood that the first data flow graph parameter may be stored in a buffer in the host memory (for specific description, refer to a related paragraph in this application), or may be storage space that is in the host memory and that is allocated to a user. This is not limited in this application. For example, when the MPI library works with an RDMA technology, data in any registered address in the host memory may be obtained, and when the MPI library works with a TCP/IP technology, the first data flow graph parameter stored in the storage space of the user needs to be copied into an MPI buffer or a data cache (refer to the following) for use.

To be specific, the data cache mentioned below may be set in both a source computing node and a destination computing node. In this way, the data cache works with an original MPI buffer (the data cache and the MPI buffer may be collectively referred to as a buffer). When the buffer is not fully occupied, the buffer can tolerate asynchronous sending and receiving operations, and can adapt to complex, asynchronous, and out-of-order receiving and sending operations of a plurality of pieces of data on a learning platform.

S507: The second computing node invokes an MPI receiving primitive based on the second triplet, to process the first data flow graph parameter.

It should be noted that for the invoking an MPI receiving primitive to process the first data flow graph parameter, the "processing" may correspond to different operations in different scenarios. This is not limited in this application. For example, the "processing" may be one or more of the following operations: invoking the MPI receiving primitive to receive the first data flow graph parameter and store the first data flow graph parameter into a data buffer of a host memory; invoking the MPI receiving primitive to modify a tag of the first data flow graph parameter, to provide the first data flow graph parameter in the host memory to use the first data flow graph parameter in a process of computing the data flow graph; and storing the first data flow graph parameter into a destination address from the data buffer. For how the first data flow graph parameter is processed by using the MPI receiving primitive, further refer to related paragraphs in the following description by using the TensorFlow platform as an example.

In one embodiment, the receiving primitive of the first data flow graph parameter carries the destination address of the first data flow graph parameter, and an embodiment of S507 is: invoking the MPI receiving primitive by using the second triplet as an interface parameter of the MPI receiving primitive, to store the first data flow graph parameter into the destination address from the data cache. For example, the destination address is located in user memory space in the host memory.

If the destination address is located in another storage device, the another storage device is a storage device in the second computing node other than the host memory. If a used MPI library supports access to the another storage device, for example, a GPU memory, the first MPI receiving primitive may also store data of a destination address in the GPU memory into a corresponding destination address. However, in another embodiment, this case may be performed after S507 by using a mechanism that is of accessing another storage device and that is on the computing platform.

In other words, S508: The second computing node stores the first data flow graph parameter in the host memory into the destination address when a destination address of the first data flow graph parameter corresponds to another storage device, where the another storage device is a memory in the second computing node other than the host memory.

S508 is similar to S504 by the first computing node described above. For specific descriptions and beneficial effects, refer to the paragraph in this step and related paragraphs in the following description. It may be considered that S507 is performed by an MPI client mentioned below.

It should be understood that a plurality of physical machines on which a distributed machine learning platform is deployed each store a data flow graph, and code of the machine learning platform is also executed by using a process, to train the data flow graph. Therefore, for the first data flow graph parameter in the data flow graph, the first computing node is a transmit end, but for another data in the data flow graph, the first computing node may be a receive end. For specific embodiments of S505 and S507, refer to related descriptions below.

Because the machine learning platform executes instructions out of order, data may not be processed by using an MPI receive statement in a timely manner after being written into a host memory of the receive end. However, an MPI buffer carried in an MPI library has small space, and a several-MB data transmission requirement in machine learning cannot be met. Therefore, a data cache may be obtained through division from the host memory in the second computing node. The data cache is specially used to store data used by the MPI primitive. For specific analysis, refer to a related paragraph in this application.

In one embodiment, S507 includes: detecting a data cache of a host memory in the second computing node by using an MPI probe primitive, to obtain the second triplet of the first data flow graph parameter, where the data cache is specially configured to store data processed by using an MPI primitive; and invoking the MPI receiving primitive to process the first data flow graph parameter. An interface parameter of the MPI receiving primitive includes the second triplet.

In one embodiment, a first thread and a second thread are run on the second computing node, and S507 includes: detecting, by the first thread, the data cache in the host memory by using a message passing interface MPI probe primitive, to obtain the second triplet; invoking, by the first thread, a first MPI receiving primitive based on a second triplet in the data cache, to process the first data flow graph parameter, where the second triplet in the data cache is obtained by the second computing node based on the MPI sending primitive; and modifying, by the second thread, a second MPI receiving primitive into an MPI wait primitive after determining that the first data flow graph parameter is processed by using the first MPI receiving primitive, where the second MPI receiving primitive is a receiving primitive that is not executed by the second thread and that corresponds to the first data flow graph parameter, an interface parameter of the second MPI receiving primitive includes a second triplet generated by the second computing node, and the MPI wait primitive is used to wait for completion of execution of the first MPI receiving primitive.

The second triplet may be obtained based on the received interface parameter of the MPI sending primitive, or may be obtained by analyzing the interface parameter and data transmitted by using the MPI sending primitive. This is not limited in this application.

That is, the second computing node may further pull up a thread (which may be referred to as a polling thread) to execute the MPI probe primitive, to detect a buffer of the host memory in the second computing node. The buffer includes the foregoing data cache, and the data cache is usually larger than an MPI buffer of a system. For a specific description, refer to the following related paragraphs. In this way, data that is not processed in a timely manner by using the MPI receiving primitive can be found. The thread may execute the MPI probe primitive in a polling manner to detect a buffer. Once such data is found, an MPI receiving primitive (which is referred to as a first MPI receiving primitive for differentiation) corresponding to the data is invoked, and an MPI primitive that is originally to be executed (which is referred to as a second MPI receiving primitive for differentiation) is modified into an MPI wait primitive, where the MPI wait primitive is used to wait for completion of execution of the first MPI receiving primitive. After the execution of the first MPI receiving primitive is completed, the thread continues polling to process data to be processed by using the MPI receive primitive.

In this way, data can be processed, in a more timely manner, by using a receiving primitive, and another to-be-executed sending primitive of the first computing node can be executed more quickly. Therefore, data transmission efficiency is improved.

In conclusion, a data transmission method on a machine learning platform from the transmit end to the receive end is described. In the method, a local graph data structure and an interface parameter generation algorithm are used to obtain an interface function parameter required for using the MPI primitive, thereby avoiding parameter pairing between the transmit end and the receive end before data is transmitted, and improving data communication efficiency. Further, storage locations of to-be-transmitted data at the transmit end and the receive end are obtained, so that when the storage location is not in the host memory, before data is sent and after the data is received, the data is moved across storage devices on the physical machine by using a mechanism of the machine learning platform. Therefore, a selection range of the MPI library is widened, and the MPI library and the machine learning platform do not contend for a resource when data is moved across storage devices. In addition, a dedicated data cache and a dedicated polling thread are set, so that in a message passing communication buffer, when a message receiving primitive is not invoked and a final destination address of a message is unknown, a message sending primitive can be used to send data, and a data sending result is immediately returned after sending of the data is completed. The buffer temporarily stores data for a future message receiving primitive, so that a synchronization operation is performed for the message sending primitive and the message receiving primitive. This removes an inherent time sequence constraint on the message sending primitive and the message receiving primitive. The sender does not need to synchronously wait, so that the sender reduces an execution time, and performance is improved.

The foregoing improvements enable the MPI library to well adapt to a characteristic of the machine learning platform and improve communication efficiency. Because the MPI library is a technology in the high-performance transmission field, the machine learning platform can fully use a resource of a high-performance transmission network, greatly improving communication efficiency, and therefore, improving computing efficiency of the computing platform.

Figure 5:
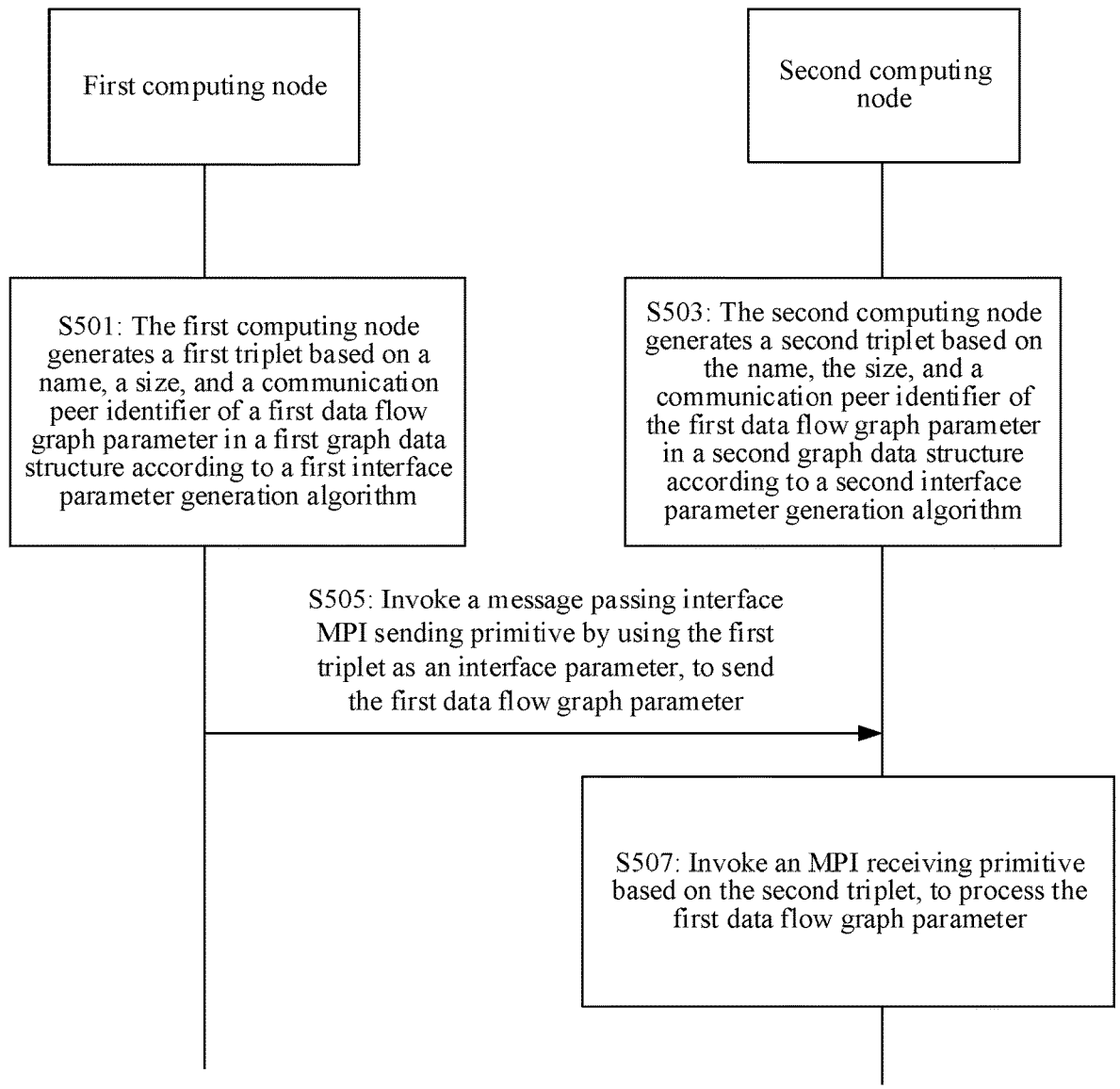
FIG. 5 is a schematic diagram of a data transmission method according to one embodiment.

For other technical details of the foregoing data transmission method on the machine learning platform in FIG. 5, descriptions of terms or steps in the method, and detailed descriptions of beneficial effects of the steps, further refer to other related paragraphs in this application document.

It should be understood that the idea described in the foregoing method may be implemented by using a plurality of types of computing platforms, for example, a machine learning platform described below in detail, or a graph computing platform, or a flow computing platform. This is not limited in this application.

The following describes a procedure in which a computing platform computes a data flow graph in this application. It should be understood that the procedure is used to explain a process in which the computing platform computes the data flow graph, and is merely an example. The process is not limited in this application. The procedure is applicable to a machine learning platform such as the TensorFlow mentioned in this application. In general, the procedure includes a data flow graph creation (or referred to as "data flow graph definition") and data flow graph running. In one embodiment, the data flow graph creation may be subdivided into substeps such as full graph construction, subgraph extraction, graph partitioning, and graph optimization. The data flow graph running may be subdivided into substeps such as input data filling, algorithm kernel function execution, and output data obtaining. For example, in the method provided in this embodiment, steps S501 to S507 may be considered as algorithm kernel function execution substeps. However, before step S501, writing information such as a name and a size of a data flow graph parameter into a graph data structure belongs to a data flow graph creation process.

In a process of the data flow graph creation, an algorithm written by a user using a programming language is converted into a data flow graph structure that is understandable to the computing platform.

In one embodiment, the process includes full graph construction. To be specific, all algorithm code written by the user is converted into a data flow graph structure. Then, subgraph extraction is performed on the data flow graph structure obtained through conversion, because the data flow graph usually includes nodes and edges that are unrelated to a final computation result. Therefore, in subgraph extraction case, the computing platform extracts, from a full graph, a node and an edge that are connected to a node in which the final computation result is located, and uses the node and the edge as a to-be-operated subgraph. Other nodes and edges that are not connected to the final computation result are ignored, and do not participate in a subsequent running process. The connection may be that a node is directly connected to the node in which the final computation result is located, or is connected, by using several edges, to the node in which the final computation result is located.

The following provides description by using an example in which each device stores some subgraphs. The computing platform performs graph partitioning on an extracted subgraph, that is, partition the extracted subgraph into several local graphs, and each local graph corresponds to one device. For example, partition may be performed according to a device allocation policy specified by the user. Algorithm logic corresponding to each node on a subgraph is executed by a device in which the node is located. It should be understood that in a graph partitioning process, a node on a subgraph is not partitioned into two devices, but an edge may be cut off. In this case, the computing platform automatically inserts a paired data sending operation node (SendOp) and a data receiving operation node (RecvOp) into a local graph obtained after partitioning. With assistance of a communication operation, overall computational logic of several local graphs partitioned into different devices can be fully consistent with that of a subgraph before partitioning. It can be learned that, after the data flow graph is partitioned, a data flow graph parameter needs to be transmitted to complete computation of these subgraphs by using a plurality of processes.

In other words, various types of data and information, for example, a data flow graph parameter and information about the data flow graph parameter in the data flow graph may be stored in the graph data structure.

It should be understood that the machine learning platform may also distribute a copy of a data flow graph to a plurality of devices, and a subgraph does not need to be partitioned. In this case, a data flow graph parameter also needs to be transmitted, and nodes used to indicate a sending operation and a receiving operation are also inserted into the data flow graph. Because the data flow graph includes an edge and information about a node, the machine learning platform inserts, into the data flow graph in a plurality of methods, the nodes used to indicate a sending operation and a receiving operation. This is not limited in this application. For ease of understanding, graph partitioning is used as an example for description below with reference to FIG. 6.

Figure 6:
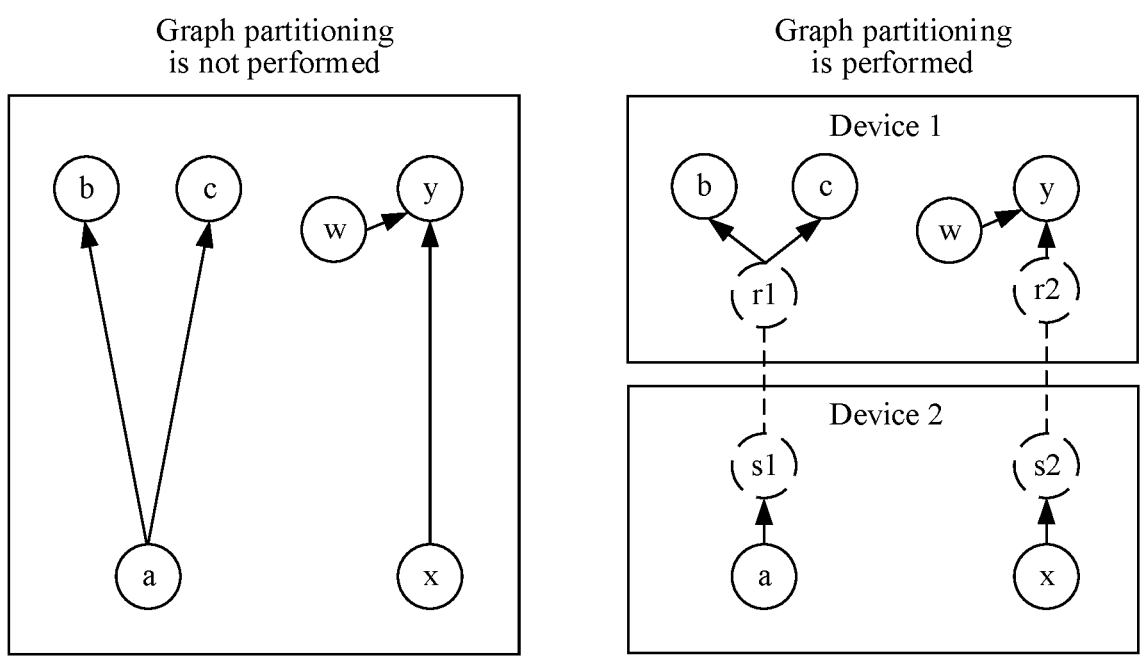
FIG. 6 is a schematic diagram of partitioning a data flow graph according to one embodiment.

As shown in FIG. 6, before graph partitioning is performed, the data flow graph includes nodes a, b, c, w, y, x, an edge that points from a to b, an edge that points from a to c, an edge that points from w to y, and an edge that points from x to y. In a graph partitioning process, the edge that points from the node a to b, the edge that points from a to c, and the edge that points from x to y are cut off, and a computing platform inserts sending operation nodes s1 and s2 into a subgraph in which the nodes a and x are located, and inserts receiving operation nodes r1 and r2 into a subgraph in which the nodes b, c, and y are located. In this way, communication relationships are separately established between s1 and r1 and between s2 and r2, to ensure that overall computation logic of the two local graphs is completely consistent with that before partitioning.

In other words, graph partitioning is also graph distribution. In a process of graph partitioning or graph distribution, the machine learning platform inevitably determines an allocation solution of each node related to a node in which a final result is located. In other words, a device to which the node is allocated is specified. Therefore, a source computing node and a destination computing node of data carried by an edge between the nodes can also be determined. It can be learned that, based on the foregoing description and FIG. 2, it can be learned that these subgraphs are allocated to a plurality of processes of the computing platform for execution. Therefore, a process corresponding to each node in the subgraph is also definite. Based on the information, in some embodiments of this application, a new field may be added to s Tensor data structure, to write a memory type of a communication peer side device and a communication peer side identifier.

In one embodiment, after graph partitioning, graph optimization may be further performed. In other words, optimization processing is performed on a subgraph obtained after the partitioning, so that a future running rate of the data flow graph is improved without changing computational logic of the subgraph.

The steps mentioned above all belong to steps of creating the data flow graph by the computing platform.

Then, the computing platform runs the data flow graph. In this step, the computing platform schedules each device to execute the data flow graph, to obtain a final computation result of an algorithm.

In one embodiment, input data filling is included. To be specific, the computing platform reads a to-be-computed external dataset from the storage device, to fill these external datasets in a variable node in the data flow graph, so that an operator in the computing node has input data. Then, a plurality of computation threads compute the data flow graph based on the subgraphs in a respective corresponding device by performing a kernel function associated with a respective subgraph. In one embodiment, the computation thread queues, according to a specific scheduling policy, nodes on a subgraph corresponding to the device, and sequentially executes kernel functions corresponding to operators on the nodes, to obtain an intermediate operation result of the algorithm. An execution sequence of the nodes is dynamically determined according to the scheduling policy and a load during running. Common scheduling policies include a full synchronization policy such as Bulk Synchronous Parallel (BSP), a half synchronization policy such as SSP (Stale Synchronous Parallel), and an asynchronous policy such as Asynchronous Parallel (ASP) policy. It should be noted that in the machine learning field, a plurality of processes does not need to perform computation synchronously. Therefore, in most cases, computation on this type of learning platform has asynchronous and random features.

It should be noted that in the to-be-executed nodes, there is a type of communication operation node, namely, a data sending operation node (SendOp) and a data receiving operation node (RecvOp) that are inserted in a previous graph partitioning process, for example, s1, s2, r1, and r2 in FIG. 5. In other words, an MPI primitive communication process described in the method in this application is a data sending or data receiving operation represented when the computing platform executes these nodes. For example, in an existing TensorFlow platform, a communication operation is implemented by using a remote procedure call protocol (RPC) mechanism.

Finally, the computing platform completes computation, outputs a computation result from a node representing the final computation result, and returns the computation result to a user program.

Figure 7:
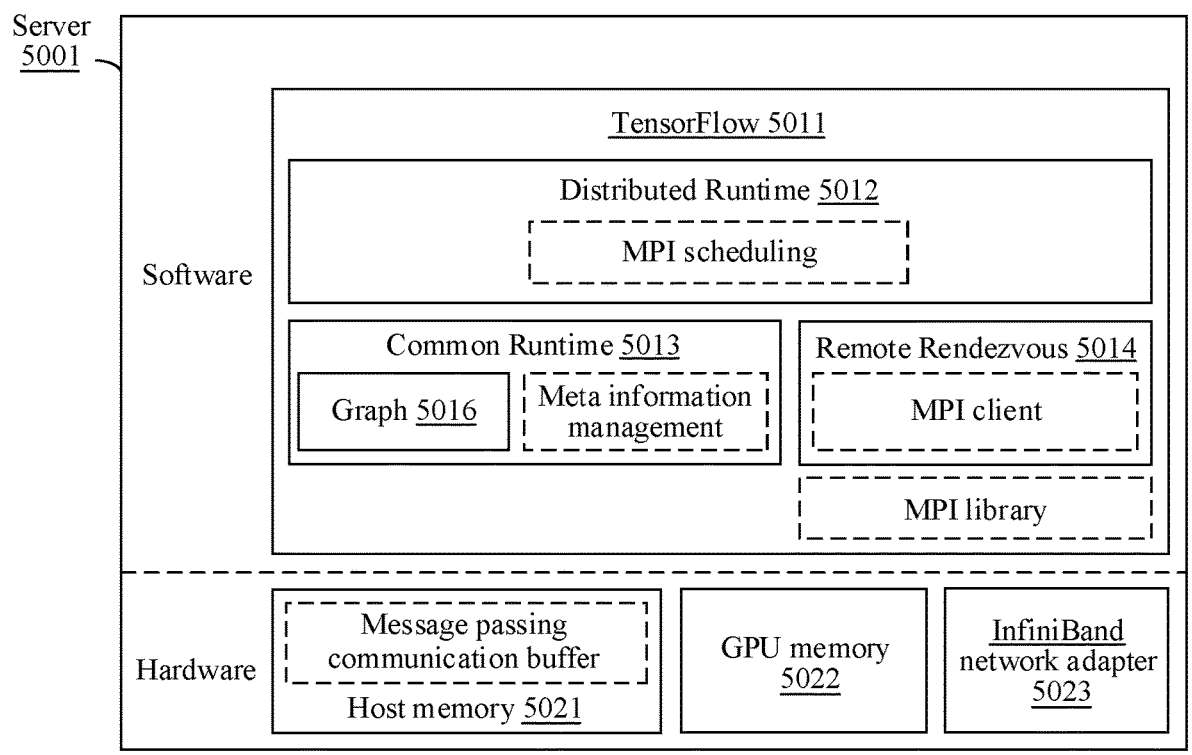
FIG. 7 is a schematic architectural diagram of a Tensor-Flow machine learning platform according to one embodiment.

With reference to FIG. 7, an open-source TensorFlow machine learning platform is used as an example below, to describe a process in which data flow graph parameter communication is implemented according to the method described in this application. However, it should be understood that embodiments of the following communication process are also applicable to another computing platform, and do not constitute a limitation on this application. By using the following communication process, on a common computing platform such as TensorFlow, a communication process in which an MPI technology is applied to computation of a data flow graph, without a need to negotiate peer information with a communication peer side end before data transmission. Use of an MPI interface function library is more flexible and conforms to computing characteristics of the computing platform, so that a communication capability of a high-performance network can be better utilized. After a test, the following method is used in a hardware environment in the following example, and communication efficiency of the method can be improved by 50%, to greatly shorten time for computing the data flow graph by the computing platform.

It should be noted that a sender of data in the following process may be considered as the first computing node mentioned above, a receiver may be considered as the second computing node mentioned above, and the sender and the receiver may be a same computing node or different computing nodes, and may be deployed on a same physical machine or may also be deployed on different physical machines. The following data flow graph parameter communication processes are all applicable.

In an example, a server running on the TensorFlow machine learning platform is provided with an NVIDIA GPU card and an InfiniBand network adapter, and a message passing communication library used by the server is an MPI interface function. The NVIDIA GPU card provides a computing acceleration capability by using a CUDA programming interface, and the InfiniBand network adapter provides an efficient communication capability by using an RDMA protocol.

As shown in FIG. 7, in a TensorFlow (5011) software framework, modules in this embodiment include a distributed runtime module 5012, a common runtime module 5013, and a remote rendezvous module 5014. The distributed runtime module 5012 is a runtime engine in TensorFlow, has a function of the runtime engine described above in this application, and may perform corresponding method steps. The common runtime module 5013 implements memory management in TensorFlow, has a function of the memory management module described above in this application, and may perform corresponding method steps. The remote rendezvous module 5014 implements communication management of TensorFlow, has a function of the communication management module described above in this application, and may perform corresponding method steps. It should be understood that the modules in this embodiment are segments of code, and it may be considered that code of a module is continuously written together. The common runtime module 5013 includes a data flow graph, namely, a graph 5016. A server further includes a host memory 5021, a GPU memory 5022, and an InfiniBand network adapter 5023.

A part shown in a dashed box in FIG. 7 is an improvement made based on an existing TensorFlow software framework in this embodiment. Inside the distributed runtime, an MPI scheduling function is added in this embodiment. Inside the common runtime, a meta information management function is added in this embodiment, and is used to manage meta information of a data flow graph parameter. The meta information includes a size, a name, and a communication peer side identifier of a data flow graph parameter mentioned below. In one embodiment, the metadata information further includes a storage location of the data flow graph parameter. The management may be at least one of operations such as addition, deletion, and modification. Inside the remote rendezvous, a function of an MPI client is added in this embodiment. In addition, an MPI library is obtained through integration on a TensorFlow platform. In a host memory used by TensorFlow, a message passing communication buffer (namely, a buffer described below) is also allocated, so that the buffer is used by an instruction in the MPI library. It can be learned that all the following improvements are at a core layer of the TensorFlow platform. In this way, the following improvements, for example, an interface parameter generation process and an interface invocation process are hidden in an original data flow graph creation and running process of TensorFlow, but are not exposed to an application developer for calling. As an improvement mechanism integrated inside the TensorFlow platform, these improvements do not change an original programming manner of TensorFlow, and can implement acceleration of an existing application program.

A data structure of a data flow graph stores information required for message passing communication, and the information may be specifically the name, the size, and the communication peer side identifier that are mentioned above. This step is performed when the common runtime module 5013 of TensorFlow creates the data flow graph. The existing module graph 5016 of TensorFlow stores, by using a series of data structures such as Tensor, a connection edge and a data flow graph parameter carried by the connection edge. These data structures already include information for representing a name of the data flow graph parameter and a size of the data flow graph parameter. The data structures are data to be transmitted by using an MPI primitive. Information included in an existing Tensor data structure may satisfy an existing data flow graph parameter transmission means, namely, a means in which RPC communication is used. However, the existing Tensor data structure does not include information about a peer process that needs to be carried in an MPI sending primitive and an MPI receiving primitive, and a memory type of a to-be-communicated-about parameter. In this embodiment of the present disclosure, a memory type (for example, represented as Dev type) field and a communication peer side identifier field of the data flow graph parameter are added to the Tensor data structure. It should be noted that, for the information mentioned above, a field used to indicate the information may be defined in the Tensor data structure. For example, the dev type field used to store a memory type is defined to store a memory type corresponding to a local node of a data flow graph parameter. For the sending primitive, the local node is a source node, and for the receiving primitive and a wait primitive that is executed by a receive end, the local end node is a destination node. For another example, the memory field may also store, as defined, a memory type corresponding to a peer node. For the sending primitive, the peer node is a destination node, and for the receiving primitive and a wait primitive that is executed by a receive end, the peer node is a source node. In a form, a plurality of fields may also be defined, to store memory types respectively corresponding to the local end node and the peer node of the data flow graph parameter. Alternatively, in a plurality of data substructures carried in the Tensor data structure, and a part related to the foregoing information needs to be parsed, concatenated, or computed. This is not limited in this embodiment of the present disclosure. The computing platform provides some auxiliary means to analyze content of the Tensor data structure, to obtain the foregoing four types of information.

The size of the data flow graph parameter is a data amount of the data flow graph parameter, namely, storage space occupied by the data flow graph parameter, and a unit is byte. A value of the parameter, namely, the size of a to-be-transmitted data flow graph parameter, for example, 3000 or 4000 is recorded.

In a process in which the common runtime module creates the data flow graph, at least a connection edge related to a node in which a final result is located is traversed (for example, all connection edges in the data flow graph may be alternatively traversed). For a data flow graph parameter carried by the connection edge, information that is used to indicate a memory type of the data flow graph parameter carried by the connection edge is learned based on a data flow graph partition result. The information that is used to indicate the memory type of the data flow graph parameter carried by the connection edge is written into the Tensor data structure, for example, may be filled in a defined memory type field, or may be distributed in a plurality of fields. In one embodiment, the memory type is a memory type corresponding to a local node of a data flow graph parameter. For the sending primitive, the local node is a source node, and for the receiving primitive and a wait primitive executed by the receive end, the local node is a destination node. An identifier of a peer device corresponding to a parameter carried by the edge is learned based on an identifier that is of a peer device and that is included in a name of an edge. The identifier of the peer device is written into the Tensor data structure, and specifically is written into a communication peer side identifier field in the Tensor data structure. For example, in the data flow graph of TensorFlow, a format of a name of a connection edge: [src_device]; [src_incarnation]; [dst_device]; [tensor_name]; [frame_id]: [iter_id].

The [dst_device] field indicates a device identifier of a destination node (namely, a receive end) of the connection edge. The [src_device] field indicates a device identifier of a source node (namely, a transmit end) of the connection edge. These device identifiers are usually strings. [src_device] may also be abbreviated to Src Dev, and [dst_device] may also be abbreviated to Dst Dev.

In addition, for the memory type field, different enumerated values may be used to identify different memory types. For example, 01 is used to identify a host memory, and 10 is used to identify a GPU memory; or 0 is used to identify a host memory, and 1 is used to identify a GPU memory; or 001 is used to identify a host memory, 010 is used to identify a GPU memory, and 100 is used to identify another hardware memory. This is not limited in this application.

Before the remote rendezvous module of TensorFlow initiates data flow graph parameter communication, the MPI interface function is used to carry the foregoing information. This step belongs to a process of running the data flow graph (namely, computing the data flow graph), and may be considered as a step of implementing the function of the MPI client mentioned above. It should be noted that in one embodiment, the foregoing information can be carried by the MPI interface function only after being processed. For example, information about the name and the size of the data flow graph parameter, and the communication peer side identifier corresponding to the data flow graph parameter are processed and then carried as an interface function parameter of an MPI primitive. However, the memory type of the data flow graph parameter is transmitted as a part of data carried in the MPI interface function. In this way, various existing general MPI interface functions can be used. This greatly improves universality. For another example, a memory type of the to-be-transmitted data flow graph parameter may also be used as a function parameter of the MPI interface function. Certainly, in this case, a definition and a use specification of the MPI interface function need to be modified. Details are not described in this application.

For ease of description, the MPI sending primitive is used as an example for description. For the MPI receiving primitive, refer to the description of the MPI sending primitive. To be specific, an interface function parameter of the MPI receiving primitive also carries a message size field, a message tag field, and a destination process sequence number field of a data flow graph parameter. In one embodiment, data carried in the MPI receiving primitive includes the memory type corresponding to the destination address of the data flow graph parameter. Details are not described herein again. The interface function parameter of the MPI sending primitive includes a message size field, and the message size field is used to indicate a size of information to be sent by using the sending primitive. In one embodiment, a value of the message size field may be equal to a parameter value of the size of the data flow graph parameter, namely, a size. In another embodiment, the value of the message size field may be equal to a value plus a parameter value of the size of the data flow graph parameter. The added value is a size of other information to be carried in the sending primitive, for example, a header length of the sending primitive mentioned below. In one embodiment, a header includes the size, the identifier (used to mark the data flow graph parameter, for example, a name of the data flow graph parameter), a number of a corresponding destination process, and a number of a corresponding source process that are of the data flow graph parameter. The message tag carried in the MPI sending primitive is used to indicate data carried in the MPI sending primitive, for example, used to indicate the name of the data flow graph parameter. The message tag carried in the MPI sending primitive is marked as a binary value with a fixed length. Therefore, the name of the data flow graph parameter may be converted, by using some algorithms, into a format that conforms to the message tag. A value of the data flow parameter is used as a value of the parameter, namely, the message tag in the MPI sending primitive. For example, the algorithm may be a hash function. It should be understood that, because of a check mechanism of the MPI interface function, an impact of a hash conflict can be avoided.

According to still another aspect, a host that executes the MPI sending primitive searches a process mapping table for a peer process sequence number, namely, a rank, based on a communication peer side identifier field of the data flow graph parameter described above. The peer process is a process that executes an MPI receiving primitive corresponding to the MPI sending primitive. For example, the process sequence number may be some numbers such as 0, 1, 2, 3, and 28. The process mapping table includes a mapping relationship between an identifier of a device on a computing platform and a sequence number of process that uses the device. A communication peer side identifier field of a data flow graph parameter stores an identifier of a device at a receive end of the data flow graph parameter. It should be understood that, after a machine learning platform is run, once a process that invokes a device is pulled up, a correspondence between the process and the device does not change before a computing task is completed. The process can learn an identifier of the device that is invoked by the process. Therefore, the machine learning platform may generate the process mapping table. For example, in a process of pulling up the process, an identifier of a device on the machine learning platform may be converted by using some functions to obtain a sequence number, and the sequence number obtained through conversion is used as a sequence number of a process corresponding to the device. Alternatively, a mapping relationship between a sequence number of the process and an identifier of a device invoked by the process may be recorded after the process is pulled up. Alternatively, when a triplet is generated, a communications peer identifier may be processed by using a function, to obtain a required process sequence number. It should be understood that these process sequence numbers are used by a primitive in the MPI library, and the machine learning platform may further store a mapping relationship between a process sequence number in the MPI library and information about a physical machine in which a process is located. Each process has a different sequence number.

Certainly, in one embodiment, the memory type is not carried in the MPI interface parameter, but is carried in data transmitted by using an MPI. For example, the memory type is serialized into a byte stream, and is used as a field in the Tensor data structure. It is clearly that, the MPI primitive is transmitted to a communication peer side process, and the peer process can learn, by parsing received data, a memory type of a destination device corresponding to the received data flow graph parameter.

In the foregoing, program code of a sender and program code of a receiver are independently run without negotiation performed by two parties of data transmission. When the two parties do not interact, a function parameter triplet <rank, size, tag> required the sending primitive and the receiving primitive in the MPI interface function library is obtained. Herein, the rank is a process sequence number of a communication peer side, the size is a size of to-be-transmitted information, and the tag is a message tag.

It should be noted that the function parameter of the MPI receiving primitive includes a destination address of to-be-transmitted data (for example, the data flow graph parameter). In other words, the MPI sending primitive carries only information about a peer device, but does not include the destination address of the to-be-transmitted data. Therefore, a receive end of the to-be-transmitted data may receive data transmitted by a transmit end device (for example, the data is stored in a host memory of the receive end in the following). However, the received data can be used to train the data flow graph only in a process in which a process on a receive side invokes an MPI receiving primitive, or even after the MPI receiving primitive is invoked.

For example, the partitioned data flow graph in FIG. 6 is used as an example. A source node S2 and a destination node R2 need to perform cross-device communication. The node R2 is located on a device B, and carries the following information: Name: Edge_x_y_0, size: 4000, Src Dev: Dev A, and Dev Type: CUDA_GPU. Herein, Dev Type: CUDA_GPU indicates a memory type of the peer device, namely, a device A. The node S2 is located on the device A, and carries the following information: Name: Edge_x_y_0, size: 4000, Dst Dev: Dev B, and Dev Type: CUDA_GPU. Herein, Dev Type: CUDA_GPU indicates a memory type of the peer device, namely, the device B. A sending primitive of the source node S2 may be written as MPI_Isend (tag=hash "Edge_x_y_0", size=4000+LEN_HEADER, rank=dev2rank("Dev B")). In other words, the sending primitive carries the triplet parameter mentioned above, and Dev Type: CUDA_GPU is carried in a data part of the sending primitive. The data part of the sending primitive may further include a name of a device, namely, Dev A in which the source node is located. A receiving primitive of the destination node R2 carries interface information, and may be written as MPI_Irecv(Tag=hash "Edge_x_y_0", size=4000+LEN_HEADER, rank=dev2rank("Dev A")). In other words, the receiving primitive carries the triplet parameter mentioned above, and Dev Type: CUDA_GPU) is carried in a data part of the receiving primitive. The data part of the receiving primitive may further include a name of a device, namely, Dev B in which the destination node is located.

In an example, 4000 in the size represents a size of a data flow graph parameter carried in the MPI primitive, and LEN_HEADER represents the length of the header (length of header) described above. The data transmitted by using the MPI primitive is a Tensor data structure obtained after serialization (Serialization), for example, a set of bytes. The Tensor data structure includes other information fields in addition to the to-be-transmitted data flow graph parameter, and the information fields are referred to as "headers" after being serialized. For example, the Tensor data structure includes a name of the Tensor data structure. The length of the header is fixed. Therefore, a constant may be added.

In this way, in a process of computing the data flow graph, the transmit end and the receive end may obtain, without interaction, a parameter for generating the MPI interface function, for example, an identifier of the peer device. Therefore, a quantity of times of communication between processes and a waiting time are reduced.

A process in which a process sends the data flow graph parameter continues to be used as an example for description. It can be learned from the foregoing description that a process that executes the MPI sending primitive needs to first obtain a to-be-sent data flow graph parameter carried in the MPI sending primitive. The process may be described as follows: determining whether the to-be-sent data flow graph parameter is located in the host memory, and copying the data into the host memory when the to-be-sent data flow graph parameter is located in another storage device. For example, the another storage device may be a memory in the host other than the host memory, for example, a GPU memory, because for a general MPI interface function, only data in the host memory can be directly used.

In one embodiment, the host memory includes an MPI buffer, and the MPI buffer is memory space allocated to the MPI library for use. Some MPI libraries come with the MPI buffer, and the MPI buffer is used to store data invoked by using the MPI primitive. For example, the memory space may be 64 KB. Optionally, the MPI buffer may also be memory space allocated to a user, that is, may be reused. It is clearly that, the MPI buffer has small space. A problem of communication synchronization of the MPI library can be alleviated to some extent. For example, information below 64 KB may be received, but the space easily runs out, and a requirement of a machine learning scenario cannot be met. For example, hundreds of KB and several MB of data flow graph parameters are relatively common. This application further provides another embodiment: A data buffer is further set in the memory of the host in which the computing platform is located, address space of the data buffer is greater than that of the MPI buffer, and the data buffer is specially configured to store data that is invoked by using the MPI primitive. For example, several MB or dozens of MB of data cache may be set in the memory, or hundreds of MB or even several GB of data cache may be set in the memory of the host. It should be understood that for a physical machine on which a machine learning platform is deployed, hardware is provided with relatively large memory space, which can meet the foregoing memory allocation requirement. In this case, the data cache is used in cooperation with the MPI buffer, to expand a capacity of the MPI buffer, so that a capability of processing data used by using the MPI primitive is further increased. In addition, the following polling thread may be used in cooperation, to accelerate processing of data sent from the host memory by the receive end. Therefore, execution of the MPI sending primitive is accelerated, to accelerate data exchange on the machine learning platform. For ease of description, the MPI buffer and the data cache are collectively referred to as buffers, and in common, are specially configured to store data invoked by using the MPI primitive.

In addition, when an RDMA communication mechanism is used in the MPI technology, data may be remotely written into a memory of a host without being perceived by a CPU of the host. To be specific, when a host that needs to receive data does not execute the MPI receiving primitive, a host that sends the data may send, by using the MPI sending primitive, the data to the host that needs to receive the data. In addition, the destination address of the transmitted data is not carried in the MPI sending primitive, and is carried byly in the MPI receiving primitive. Therefore, only when a peer end executes the MPI receiving primitive, the received data can be passed to the destination address. When the MPI receiving primitive is not executed, the received data is first stored in these buffers. In this way, if free space in a buffer of the host that needs to receive the data is insufficient to place to be-received data, an MPI primitive that carries the to-be-received data cannot be executed. That is, there is synchronization and ordered constraints for the MPI technology. To be specific, in order that the transmit end continuously executes MPI sending primitives smoothly, the receive end needs to execute, as soon as possible after receiving data, an MPI receiving primitive corresponding to the received data. In this case, the foregoing data buffer is added, so that asynchronous and out-of-order receiving and sending operations can be allowed to a greater extent, without a need to add an additional message synchronization mechanism. Therefore, a requirement of a computing platform such as TensorFlow is met. An MPI library that requires synchronization and ordered constraints can be interconnected with a TensorFlow that has asynchronous and out-of-order features. In a data flow graph communication process, this helps to improve performance of parameter communication of the machine learning platform.

On the TensorFlow platform, it may be considered that the foregoing step of obtaining, by a process of the transmit end, the to-be-transmitted data flow graph parameter is performed before the remote rendezvous module executes the MPI sending primitive (for example, MPI_Send or MPI_Isend). For example, the remote rendezvous module reads a memory type field of a to-be-communicated-about data flow graph parameter, and determines whether the data flow graph parameter is located in an address space in the host memory. If the memory type field is located in an address space in the host memory, this step ends. If not, for example, the to-be-communicated-about data flow graph parameter is located in the GPU memory, a cudaMemcpy function provided by the CUDA programming interface is performed, and the to-be-communicated-about data flow graph parameter is copied from the GPU memory to the host memory. In this way, regardless of whether a selected MPI library supports access to the GPU memory, the MPI library can be used on the machine learning platform, and the GPU memory does not need to be accessed by using the MPI interface function, so that a selection range of the MPI library is larger, and a problem of resource preemption for accessing the GPU in the solution of Baidu mentioned above is greatly alleviated. In addition, because the remote rendezvous module on the TensorFlow platform performs the step and belongs to the core layer of the TensorFlow platform, a lock of the process does not to be added to the GPU memory in an entire process in which a thread executes an MPI sending primitive or an MPI receiving primitives. Instead, a lock only needs to be added to the foregoing step of copying the to-be-sent data from the GPU memory into the host memory, so that a waiting time of another thread is reduced, and lock contention for accessing the GPU memory by different processes is greatly reduced.

In a process of computing a data flow graph that is deployed across devices, receiving and sending of a data flow graph parameter are definitely included, and may be considered as the function of the MPI client mentioned above. A transmitted data flow graph parameter is stored in a buffer in a corresponding host memory before being sent and received (the receiving means that the data flow graph parameter is processed at the receive end by using the MPI receiving primitive). The buffer is an address segment in a memory allocated to the MPI library. The buffer may be the MPI buffer mentioned above, or may be a data cache.

The following describes receiving and sending of the data flow graph parameter. In one embodiment, cross-device communication needs to be performed to detect whether there is a data flow graph parameter in the data flow graph. If there is a data flow graph parameter in the data flow graph, it is determined whether a to-be-executed communication operation is a data sending operation or a data receiving operation, and if the to-be-executed communication operation is a data sending operation, data (namely, the data flow graph parameter) is sent by using the MPI_Send or MPI_Isend primitive; or if the to-be-executed communication operation is a data receiving operation, data is received by using the MPI_Recv or MPI_Irecv primitive. Then, the remote rendezvous module uses the received data as a data flow graph parameter. After a sending or receiving operation ends, it is detected again whether cross-device communication still needs to be performed for another parameter, and so on. This cyclic process may be performed by a plurality of threads that are run in a physical machine. These threads are controlled by using some scheduling mechanisms, so that different instructions are performed according to the scheduling mechanisms to complete different operations. For example, data sending and data receiving are two of operations that can be dynamically scheduled and performed by the threads. For example, a plurality of primitives that are executed after events occur are defined in the scheduling mechanism. To be specific, execution of a primitive is triggered by which event that occurs. For example, as mentioned above, if it is detected that cross-device communication further needs to be performed for a data flow graph parameter in a data flow graph that the host is responsible for computing, the MPI sending primitive or the MPI receiving primitive is executed based on an operation type. The machine learning platform is usually asynchronous and out-of-order. This manner is relatively common on the machine learning platform.

It should be noted that the MPI receiving primitive is further used to process data in a buffer, so that a process or thread used for computation on the machine learning platform uses the data in the buffer. For example, meta information of the data may be processed (for example, a status of the data is determined, or received data in to-be-received data is determined), or the synchronization processing may be performed on the data, for example, the process or thread used for computation on the machine learning platform is notified that the data is ready, or the data may be stored in the destination address. Different MPI libraries may include different embodiments when the MPI receiving primitive is executed.

Because one thread can execute only one MPI receiving primitive once, and interaction between a plurality of physical machines is performed on a machine learning platform deployed in a distributed manner, a physical machine on which a machine learning platform is deployed may receive, in a short time, data transmitted by using a plurality of MPI sending primitives. Therefore, the foregoing thread may not be able to process, in a timely manner by using the MPI receiving primitive, data that is sent to the host memory of the physical machine. In another embodiment, a dedicated thread may be allocated to the physical machine on which the machine learning platform is deployed. The thread is specially configured to: detect data sent by using the MPI sending primitive, and receive the detected data. The dedicated thread belongs to a type of dedicated thread, and does not need to be controlled by using the foregoing scheduling mechanism. For example, the dedicated thread may be completed by the distributed runtime module in cooperation with the remote rendezvous module. In this way, realtimeness of receiving information by using the MPI receiving primitive can be improved, and a time in which a remaining MPI sending primitive waits to be executed in a transmit end program can also be reduced.

The following describes a method for running the dedicated thread: circularly detecting, in a polling manner, whether triplet information of to-be-received data is in the memory of the host, and processing data corresponding to the detected triplet, to accelerate processing on data that is in the host memory and that is processed by using the MPI receiving primitive. For ease of description, the thread may be referred to as a polling thread. Specifically, the polling thread polls the buffer in the host memory, namely, the foregoing storage space that specially stores data invoked by using the MPI primitive, for example, polls the MPI buffer. Alternatively, when the host memory includes the MPI buffer and the data cache, the MPI buffer and the data cache are polled. The process may also be considered as the foregoing MPI scheduling function, and is implemented inside the host of the receive end of the data flow graph parameter. The following describes a round of procedure in the polling process. The polling thread invokes a detect primitive such as MPI_Probe or MPI_Iprobe in the MPI library, to detect whether a to-be-received data flow graph parameter or a triplet corresponding to the data flow graph parameter in the host memory waits to be processed by using a corresponding MPI receiving primitive. That is, the MPI receiving primitive corresponding to the to-be-received data flow graph parameter is not executed. If not, the probe primitive continues to be executed to poll the buffer in the host memory; or if yes, an MPI_Irecv primitive corresponding to the detected data flow graph parameter is invoked. In this way, the to-be-received data flow graph parameter can be received and stored in a local memory. The polling thread determines, based on a detected triplet <rank, size, tag> corresponding to a destination computing node side, an interface parameter of the MPI_Irecv primitive that is used to process the data flow graph parameter. Then, an MPI_Recv or MPI_Irecv primitive corresponding to the data flow graph parameter in an execution policy that is originally to be executed by the another thread is changed into an MPI_Wait primitive, to wait for the polling thread to complete processing of the data flow graph parameter by using the MPI_Irecv primitive (for example, the data flow graph parameter is placed in storage space corresponding to the destination address). If the polling thread completes processing of the data flow graph parameter by using the MPI_Irecv primitive, after this round of polling ends, the polling thread continues to poll the buffer in the host memory, to detect whether a to-be-received data flow graph parameter in the host memory waits to be processed by using a corresponding MPI receiving primitive. Actually, when the MPI_Irecv primitive of the polling thread starts to be executed, the polling thread sends returning information to a receiving primitive in an execution policy that is originally to be executed by another thread, to trigger a change of the receiving primitive into an MPI_Wait primitive, for example, returns an MPI request (MPI_Request) object. The object may include a detected triplet. In this way, an MPI_Wait primitive that is not executed and is originally used to process data corresponding to the triplet may be invoked based on the object. Therefore, data that has been written into the buffer of the host memory of the receive end can be processed more quickly. In this case, space occupied by received data in the buffer of the host memory of the receive end can be freed, and the other data from the transmit end can be written more quickly. In other words, the transmit end may reduce a waiting time before executing another sending primitive, so that the receive end can process more data in the buffer in a shorter time, and the transmit end can also execute more sending primitive in a shorter time.

In one embodiment, probing may be continuously performed in an infinite loop manner. For example, the thread runs an entire process of computing the data flow graph to complete computation.

The following briefly describes how the probing thread detects data to be processed by using the MPI receiving primitive in the host memory. In the MPI library, a corresponding record is made in some data structures. If data is not processed by the using MPI receiving primitive, the data is stored in a data structure, and the MPI probe primitive can be used to detect the record, to determine that data corresponding to the record is not processed by using the MPI receiving primitive. If data is received by using the MPI receiving primitive or is being received by using the MPI primitive, a record corresponding to the data is cleared from the foregoing data structure, and cannot be detected by using the MPI probe primitive. In one embodiment, the MPI receiving primitive (for example, MPI_Recv) and the MPI wait primitive (for example, MPI_Wait) may be considered to be performed by the remote rendezvous module on the TensorFlow platform.

Usually, these data flow graph parameters are provided, by using the MPI receiving primitive, for a thread or process that is of the receive end and that is used for computation, to perform computation of machine learning. For example, the MPI receiving primitive is used to place the data flow graph parameters in storage space that is in a host memory and that belongs to a user. The user is a user performing machine learning. In addition, when it is determined that the destination address of the data flow graph parameter is not in the host memory, the copy of the data flow graph parameter is stored into a device corresponding to the destination address. This step may also be considered as a part of the function of the MPI client in the remote rendezvous module. For example, the destination address is in the GPU memory. The cudaMemcpy function provided by the CUDA programming interface is performed, and the received data is copied into the GPU memory.

Because a primitive in the MPI library is used, data is first written into the buffer in the host memory before being written into the destination address. However, during computation of the data flow graph, destination addresses of many data flow graph parameters are other devices such as the GPU. In this way, after data is received, the data is written into the GPU by using the CUDA programming interface on the computing platform, and a used MPI library does not need to support access to the GPU memory. This greatly extends types of available MPI libraries, and also greatly alleviates a problem of resource preemption for accessing the GPU in the foregoing Baidu solution. In addition, because the remote rendezvous module on the TensorFlow platform performs the step and belongs to the core layer of the TensorFlow platform, a lock of the process does not to be added to the GPU memory in an entire process in which a process executes an MPI sending primitive or an MPI receiving primitives. Instead, a lock only needs to be added to the foregoing step of copying the to-be-sent data from the GPU memory into the host memory, so that a waiting time of another thread is reduced, and lock contention for accessing the GPU memory by different processes is greatly reduced.

The method corresponding to FIG. 5 to FIG. 7 may be run in the systems and the servers shown in FIG. 7 and FIG. 3.

In conclusion, according to the data transmission method provided in this application, communication peer sides do not need to negotiate peer information with each other before data transmission, a conflict between synchronization and ordered constraints of the MPI library and asynchronous and out-of-order data flow graph communication is resolved, and a problem of resource preemption for accessing the GPU by the MPI library and the computing platform is also resolved. Therefore, the MPI technology can better adapt to a computing platform that is deployed in a distributed manner, a network transmission resource can be fully used, and data transmission efficiency on the machine learning platform is improved, to improve a service processing speed of the machine learning platform.

Figure 8:
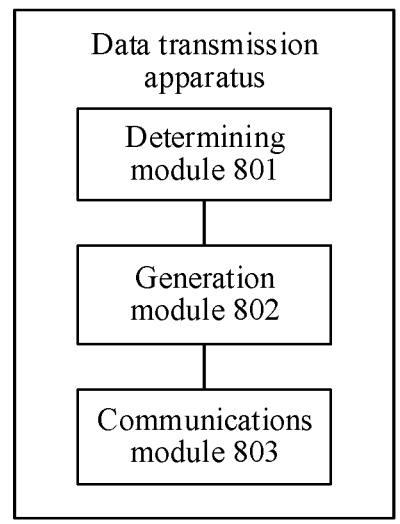
FIG. 8 is a schematic diagram of a data transmission apparatus according to one embodiment.

In another aspect, an embodiment of the present disclosure provides a data transmission apparatus in a distributed computing system shown in FIG. 8. The distributed computing system includes a first computing node and a second computing node. The data transmission apparatus is located on the first computing node, and the data transmission apparatus includes: a determining module 801, where the determining module 801 is configured to determine a name, a size, and a communication peer side identifier of a first data flow graph parameter in a first data flow graph from a first graph data structure in the first computing node, where the first data flow graph parameter is a parameter carried by a connection edge of the first data flow graph, and the communication peer side identifier corresponds to the second computing node;

a generation module 802, where the generation module 802 is configured to generate a first triplet based on the name, the size, and the communication peer side identifier of the first data flow graph parameter in the first graph data structure according to a first interface parameter generation algorithm, where the first triplet includes a message tag, a message size, and a destination process sequence number, the message tag corresponds to the name of the first data flow graph parameter, the message size corresponds to the size of the first data flow graph parameter, and the destination process sequence number corresponds to a process that is on the second computing node and that receives the first data flow graph parameter; and a communications module 803, where the communications module 803 is configured to invoke a message passing interface MPI sending primitive by using the first triplet as an interface parameter, to send the first data flow graph parameter to the second computing node, so that the second computing node invokes an MPI receiving primitive by using, as an interface parameter, a second triplet corresponding to the first triplet, to process the first data flow graph parameter, where the second triplet is generated based on a second graph data structure in the second computing node according to a second interface parameter generation algorithm, and the second interface parameter generation algorithm is the same as the first interface generation algorithm.

In one embodiment, in the aspect of invoking a message passing interface MPI sending primitive by using the first triplet as an interface parameter, to send the first data flow graph parameter to the second computing node, the communications module 803 is configured to read the first data flow graph parameter from a host memory in the first computing node by using the first triplet as the interface parameter and by using the message passing interface MPI sending primitive, to send the first data flow graph parameter to the second computing node.

In one embodiment, the first computing node further stores information about a storage device in which the first data flow graph parameter is located, the first computing node further includes a reading module 804, and the reading module 804 is configured to: when the information about the storage device indicates another storage device, copy the first data flow graph parameter from the another storage device into the host memory in the first computing node, where the another storage device is a memory in the first computing node other than the host memory.

In one embodiment, the first interface parameter generation algorithm includes a first algorithm, a second algorithm, and a third algorithm, and in the aspect of generating a first triplet based on the name, the size, and the communication peer side identifier of the first data flow graph parameter in the first graph data structure according to a first interface parameter generation algorithm, the generation module 801 is configured to: determine the message tag in the first triplet based on the name of the first data flow graph parameter in the first graph data structure according to the first algorithm, determine the message size in the first triplet based on the size of the first data flow graph parameter in the first graph data structure according to the second algorithm, and determine the destination process sequence number in the first triplet based on the communication peer side identifier of the first data flow graph parameter in the first graph data structure according to the third algorithm.

It can be learned that in the foregoing embodiments, the data transmission apparatus shown in FIG. 8 is used as a transmit end in data transmission. In some other embodiments, the data transmission apparatus shown in FIG. 8 may perform an operation corresponding to a transmit end, to serve as the receive end in data transmission. In other words, in some embodiments, the data transmission apparatus shown in FIG. 8 may have a function of the transmit end and a function of the receive end. Alternatively, the data transmission apparatus shown in FIG. 8 is a transmit end in transmission of some data, and is a receive end in transmission of some other data.

The following describes an embodiment in which the data transmission apparatus in the distributed computing system shown in FIG. 8 is used as a data receiver. The distributed computing system includes a first computing node and a second computing node. The data transmission apparatus is located on the second computing node, and the data transmission apparatus includes: a determining module 801, where the determining module 801 is configured to determine a name, a size, and a communication peer side identifier of a first data flow graph parameter in a second data flow graph from a second graph data structure in the second computing node, where the communication peer side identifier of the first data flow graph parameter in the second data flow graph corresponds to the first computing node;

a generation module 802, where the generation module 802 is configured to generate a second triplet based on the name, the size, and the communication peer side identifier of the first data flow graph parameter in the second graph data structure according to a second interface parameter generation algorithm, where the second triplet includes a message tag, a message size, and a source process sequence number, the message tag corresponds to the name of the first data flow graph parameter, the message size corresponds to the size of the first data flow graph parameter, and the source process sequence number corresponds to a process that is on the first computing node and that sends the first data flow graph parameter; and a communications module 803, where the communications module 803 is configured to invoke a message passing interface MPI receiving primitive based on the second triplet, to process the first data flow graph parameter from the first computing node, where the first data flow graph parameter is sent by the first computing node by using an MPI sending primitive, an interface parameter of the MPI sending primitive includes a first triplet corresponding to the second triplet, the first triplet is generated by the first computing node based on a first graph data structure in the first computing node according to a first interface parameter generation algorithm, and the second interface parameter generation algorithm is the same as the first interface generation algorithm.

In one embodiment, the communications module 803 includes a first thread and a second thread, a host memory in the second computing node includes a data cache, the data cache is specially configured to store data processed by using an MPI primitive, and in the aspect of invoking a message passing interface MPI receiving primitive by using the second triplet as an interface parameter, to process the first data flow graph parameter from the first computing node, the first thread is configured to detect the data cache in the host memory by using a message passing interface MPI probe primitive, to obtain the second triplet; the first thread is configured to invoke a first MPI receiving primitive based on a second triplet in the data cache, to process the first data flow graph parameter, where the second triplet in the data cache is obtained by the second computing node based on the MPI sending primitive; and the second thread is configured to modify a second MPI receiving primitive into an MPI wait primitive after determining that the first data flow graph parameter is processed by using the first MPI receiving primitive, where the second MPI receiving primitive is a receiving primitive that is not executed by the second thread and that corresponds to the first data flow graph parameter, an interface parameter of the second MPI receiving primitive includes a second triplet generated by the second computing node, and the MPI wait primitive is used to wait for completion of execution of the first MPI receiving primitive.

In this way, processing of a prepared data flow graph parameter indicated by a triplet in the data cache can be accelerated, and a speed of processing the received data by the receive end can be increased, to increase a speed of executing a sending primitive by the transmit end. In addition, in the data cache, a capability of the MPI primitive to adapt to out-of-order and asynchronous receiving and sending operations, and the data cache can better adapt to a data transmission feature on a computing platform.

In one embodiment, in the aspect of invoking a first MPI receiving primitive based on a second triplet in the data cache, to process the first data flow graph parameter, the first thread in the communications module 803 is configured to:

when a destination address of the first data flow graph parameter corresponds to memory space that is in the host memory in the second computing node and that is allocated to a user for use, invoke the first MPI receiving primitive by using the second triplet in the data cache as an interface parameter of the first MPI receiving primitive, to store the first data flow graph parameter into the destination address of the first data flow graph parameter from the data cache.

In one embodiment, the data transmission apparatus further includes a storage module 805, and the storage module 805 is configured to: store the first data flow graph parameter in the host memory into the destination address when a destination address of the first data flow graph parameter corresponds to another storage device, where the another storage device is a memory in the second computing node other than the host memory.

In one embodiment, the second interface parameter generation algorithm includes a first algorithm, a second algorithm, and a third algorithm, and in the aspect of generating a second triplet based on the name, the size, and the communication peer side identifier of the first data flow graph parameter in the second graph data structure according to a second interface parameter generation algorithm, the generation module 802 is configured to: determine the message tag in the second triplet based on the name of the first data flow graph parameter in the second graph data structure according to the first algorithm in the second interface parameter generation algorithm, determine the message size in the second triplet based on the size of the first data flow graph parameter in the second graph data structure according to the second algorithm in the second interface parameter generation algorithm, and determine the source process sequence number in the second triplet based on the communication peer side identifier of the first data flow graph parameter in the second graph data structure according to the third algorithm in the second interface parameter generation algorithm.

It can be learned that, in some cases, the data transmission apparatus corresponding to FIG. 8 corresponds to the first computing node and the second computing node described above, and may perform the method of a sender or a receiver in the methods shown in FIG. 5 to FIG. 7 described above. For various explanations and descriptions related to the data transmission apparatus corresponding to FIG. 8 and beneficial effects of steps performed by the modules, refer to the foregoing corresponding paragraphs. Details are not described herein again. In this case, a communication process in which an MPI technology is applied to computation of a data flow graph can be simplified. Communication peer sides do not need to negotiate peer information with each other before data transmission. Therefore, the MPI technology can better adapt to a computing platform that is deployed in a distributed manner, to improve data transmission efficiency in the distributed computing system, and improve efficiency of computing a data flow graph in the distributed computing system.

It should be further noted that the determining module 801, the generation module 802, and the communications module 803 in FIG. 8 may be different code or different processes or threads that run code. A division manner shown in FIG. 8 is merely an example. In some embodiments, these modules may be named or divided in another manner. For example, some modules are one module. The determining module 801 may correspond to the foregoing memory management module 3014 or the common runtime module 5013 on the TensorFlow platform. The generation module 802 and the communications module 803 may correspond to the foregoing communication management module 3015 or the remote rendezvous module 5014 on the TensorFlow platform. However, when the communications module 803 includes the first thread and the second thread, it may be considered that the first thread belongs to the foregoing runtime engine module 3013 or the distributed runtime module 5012 on the TensorFlow platform, and the second thread belongs to the communication management module or the remote rendezvous module 5014 on the TensorFlow platform. Therefore, the data transmission apparatus shown in FIG. 8 may implement functions of the foregoing modules. For a specific embodiment, refer to the foregoing descriptions.

Based on the foregoing described embodiments, a person skilled in the art may clearly understand that, for the purpose of convenient and brief description, division of the foregoing functional modules is used as an example for description. In actual application, the foregoing functions may be allocated to different functional modules and implemented based on a requirement. In other words, an inner structure of an apparatus is divided into different functional modules, to implement all or some of the functions described above. For a detailed working process of the foregoing apparatus and unit, refer to a corresponding process in the foregoing method embodiments. Details are not described herein again.

Figure 9:
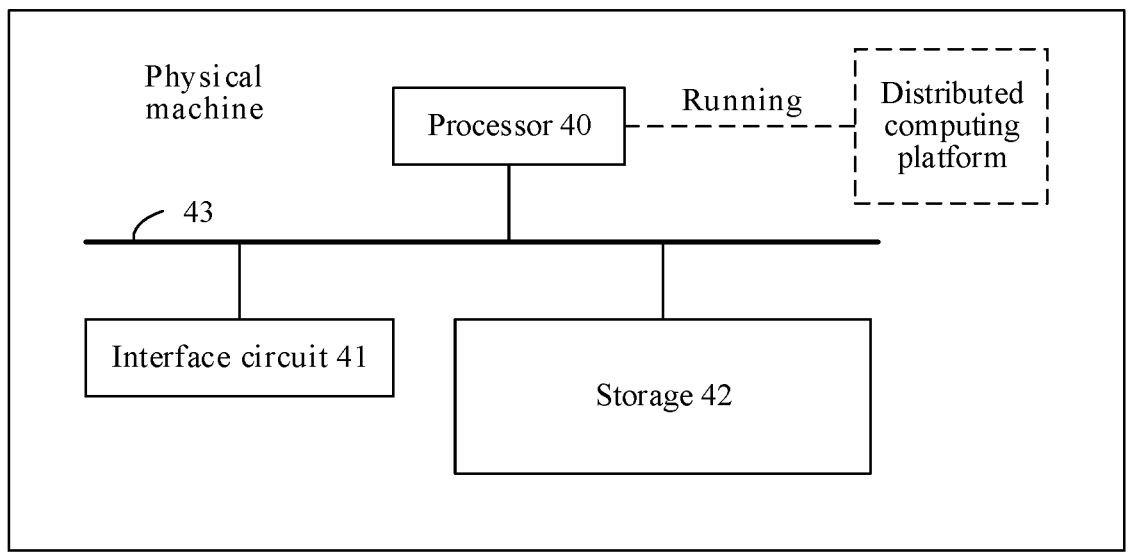
FIG. 9 is a schematic diagram of a physical machine configured to perform a method in this application according to one embodiment.

According to another aspect, FIG. 9 is a schematic block diagram of a physical machine according to an embodiment of the present disclosure. This embodiment of the present disclosure provides a physical machine. The physical machine includes a processor 40 and a storage 42. The storage 42 is a non-transitory computer readable medium that stores executable code. The physical machine may be the foregoing first computing node or the foregoing second computing node. A distributed computing platform is run on the processor 40 by using the program in the storage 42.

The physical machine may execute the executable code in the storage 42 by using the processor 40, to perform the foregoing methods. It is clearly that, FIG. 9 is a simpler expression form than the server that is shown in FIG. 3 or FIG. 7 and that can run the methods in this application. The data transmission apparatus shown in FIG. 8 may be run in the architecture shown in FIG. 9, FIG. 3, or FIG. 7.

In one embodiment, the non-transitory computer readable medium that stores executable code is the storage 42, and the physical machine further includes an interface circuit 41 and a system bus 43.

The processor 40 may be implemented by using a plurality of processors. The processor 40 may be a central processing unit (CPU). Alternatively, the processor 40 may be another general purpose processor, a graphics processing unit (GPU), a digital signal processor (DSP), an application-specific integrated circuit (ASIC), or a field-programmable gate array (FPGA) or another programmable logic device, a discrete gate or a transistor logic device, a discrete hardware component, or the like. The general purpose processor may be a microprocessor, or the processor may be any conventional processor, or the like.

For example, physical machines in FIG. 5 to FIG. 7 and corresponding embodiments are described by using a physical machine that includes a CPU and a GPU as an example. If the processor includes the GPU, the GPU and a GPU memory are usually encapsulated in a same chip. In other words, the processor 40 may include memories of some processors.

The interface circuit 41 may be a communications interface of hardware on the physical machine. The communications interface may be a wireless communications interface, and may further include a radio frequency circuit such as an antenna. For example, the wireless communications interface may be a wireless module of the physical machine. The processor 40 receives data from or sends data to another device such as another physical machine by using the interface circuit 41. For example, the network adapter 3024 or the InfiniBand network adapter 5023 shown on the physical machines in FIG. 3 and FIG. 7 is an embodiment of the communications interface.

The storage 42 may include a volatile memory, for example, a random access memory (RAM), a memory, and the like. The storage 42 may also include a nonvolatile memory, for example, a read-only memory (ROM), a flash memory, a hard disk (HDD), or a solid-state drive (SSD). The storage 42 may also include a combination of the foregoing types of memories. There may be a plurality of storages 42 for use by the plurality of processors 40, for example, the host memory and the GPU memory described in the foregoing embodiments.

The storage 42 may include an underlying storage medium and a memory. The memory is coupled to the underlying storage medium, and is configured to be used as a cache of the underlying storage medium.

The system bus 43 may include a data bus, a power supply bus, a control bus, a status signal bus, and the like. The system bus 43 is configured to connect the processor 40, the storage 42, and the interface circuit 41. In this embodiment, for clarity of description, various buses are illustrated as the system bus 43 in FIG. 9.

The physical machine provided in this embodiment of the present disclosure may be configured to perform any method recorded in this application, for example, any method performed by the first computing node or the second computing node corresponding to FIG. 5 to FIG. 7. For descriptions of the method, explanations and descriptions of terms used in the method, and beneficial effects of the steps in the physical machine corresponding to FIG. 9, refer to the foregoing corresponding paragraphs. Details are not described herein again. In this case, a communication process in which an MPI technology is applied to computation of a data flow graph can be simplified. Communication peer sides do not need to negotiate peer information with each other before data transmission. Therefore, the MPI technology can better adapt to a computing platform that is deployed in a distributed manner, to improve data transmission efficiency in the distributed computing system, and improve efficiency of computing a data flow graph in the distributed computing system.

In one embodiment, a non-transitory computer readable medium that stores an executable program is provided. The executable program includes any method described in this application. The non-transitory computer readable medium may be installed in a physical machine. When the physical machine is run, a processor of the physical machine executes a computer executable instruction, so that the physical machine performs any method described in this application. For descriptions of the method stored in the non-transitory computer readable medium, explanations and effects of various nouns in the method, and beneficial effects of the steps, refer to the foregoing corresponding paragraphs. Details are not described herein again.

In one embodiment, the non-transitory computer readable medium may be the memory 42 shown in FIG. 9.

In the several embodiments provided in this application, it should be understood that the disclosed system, apparatus, and method may be implemented in other manners. For example, the described apparatus embodiment is merely an example. For example, the module or unit division is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and components displayed as units may or may not be physical units. To be specific, the components may be located in one position, or may be distributed on a plurality of network units. Some or all of the units may be selected based on an actual requirement to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or all or a part of the technical solutions may be implemented in the form of a software product. The computer software product is stored in a storage medium and includes several instructions for instructing a computer device (which may be a personal computer, a server, a network device, or the like) or a processor to perform all or some steps of the methods described in the embodiments of the present disclosure. However, the foregoing storage medium includes any medium that can store program code, such as a USB flash drive, a removable hard disk, a ROM, a RAM, a magnetic disk, or a compact disc.

The foregoing descriptions are merely embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

It may be clearly understood by a person skilled in the art that, for the purpose of convenient and brief description, division of the foregoing functional modules is used only as an example for illustration. In actual application, the foregoing functions can be allocated to different function modules and implemented based on a requirement. In other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and components displayed as units may or may not be physical units. To be specific, the components may be located in one position, or may be distributed on a plurality of network units. Some or all of the units may be selected based on an actual requirement to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or all or a part of the technical solutions may be implemented in the form of a software product. The computer software product is stored in a storage medium and includes several instructions for instructing a computer device (which may be a personal computer, a server, a network device, or the like) or a processor to perform all or some steps of the methods described in the embodiments of the present disclosure. The storage medium is a non-transitory medium, and includes any medium that can store program code, such as a flash memory, a removable hard disk, a read-only memory, a random access memory, a magnetic disk, or a compact disc.

The foregoing descriptions are merely embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure is subject to the appended claims.

What is claimed is:

1. A distributed computing system, comprising:
a first computing node and a second computing node, a first graph data structure in the first computing node that stores a name, a size, and a communication peer side identifier of a first data flow graph parameter in a first data flow graph, wherein the first data flow graph parameter is a parameter carried by a connection edge of the first data flow graph, a second graph data structure in the second computing node that stores the name, the size, and a communication peer side identifier of the first data flow graph parameter in a second data flow graph, the communication peer side identifier of the first data flow graph parameter in the first data flow graph corresponds to the second computing node, and the communication peer side identifier of the first data flow graph parameter in the second data flow graph corresponds to the first computing node;
wherein the first computing node is configured to generate a first triplet based on the name, the size, and the communication peer side identifier of the first data flow graph parameter in the first graph data structure according to a first interface parameter generation algorithm, wherein the first triplet comprises a message tag, a message size, and a destination process sequence number, the message tag corresponds to the name of the first data flow graph parameter, the message size corresponds to the size of the first data flow graph parameter, and the destination process sequence number corresponds to a process that is on the second computing node and that receives the first data flow graph parameter;
wherein the second computing node is configured to generate a second triplet based on the name, the size, and the communication peer side identifier of the first data flow graph parameter in the second graph data structure according to a second interface parameter generation algorithm, wherein the second interface parameter generation algorithm is the same as the first interface parameter generation algorithm, the second triplet comprises the message tag, the message size, and a source process sequence number, and the source process sequence number corresponds to a process that is on the first computing node and that sends the first data flow graph parameter;
wherein the first computing node is configured to invoke a message passing interface (MPI) sending primitive by using the first triplet as an interface parameter, to send the first data flow graph parameter to the second computing node; and
wherein the second computing node is configured to invoke an MPI receiving primitive based on the second triplet to process the first data flow graph parameter.

2. The system according to claim 1, wherein the first computing node is configured to read the first data flow graph parameter from a host memory in the first computing node by using the first triplet as the interface parameter and by using the MPI sending primitive to send the first data flow graph parameter to the second computing node.

3. The system according to claim 2, wherein the first computing node further stores information about a storage device in which the first data flow graph parameter is located, the information about the storage device indicates another storage device, and the first computing node is further configured to: copy the first data flow graph parameter from the other storage device into the host memory in the first computing node, wherein the other storage device is a memory in the first computing node other than the host memory.

4. The system according to claim 1, wherein the first interface parameter generation algorithm comprises a first algorithm, a second algorithm, and a third algorithm, and the first computing node is configured to:
determine the message tag in the first triplet based on the name of the first data flow graph parameter in the first graph data structure according to the first algorithm, determine the message size in the first triplet based on the size of the first data flow graph parameter in the first graph data structure according to the second algorithm, and determine the destination process sequence number in the first triplet based on the communication peer side identifier of the first data flow graph parameter in the first graph data structure according to the third algorithm; and
the second computing node is configured to:
determine the message tag in the second triplet based on the name of the first data flow graph parameter in the second graph data structure according to a first algorithm in the second interface parameter generation algorithm, determine the message size in the second triplet based on the size of the first data flow graph parameter in the second graph data structure according to a second algorithm in the second interface parameter generation algorithm, and determine the source process sequence number in the second triplet based on the communication peer side identifier of the first data flow graph parameter in the second graph data structure according to a third algorithm in the second interface parameter generation algorithm.

5. The system according to claim 1, wherein
the second computing node is configured to: detect a data cache in a host memory in the second computing node by using an MPI probe primitive, and obtain the second triplet of the first data flow graph parameter,
the data cache is configured to store data processed by using an MPI primitive, and invoke the MPI receiving primitive to process the first data flow graph parameter, wherein an interface parameter of the MPI receiving primitive comprises the second triplet.

6. The system according to claim 1, wherein the receiving primitive of the first data flow graph parameter carries a destination address of the first data flow graph parameter, and the second computing node is configured to invoke the MPI receiving primitive by using the second triplet as an interface parameter of the MPI receiving primitive to store the first data flow graph parameter into the destination address from a data cache.

7. A method of data transmission in a distributed computing system comprising a first computing node and a second computing node, the method comprising:
determining a name, a size, and a communication peer side identifier of a first data flow graph parameter in a first data flow graph from a first graph data structure in the first computing node, wherein the first data flow graph parameter is a parameter carried by a connection edge of the first data flow graph, and the communication peer side identifier corresponds to the second computing node;
generating a first triplet based on the name, the size, and the communication peer side identifier of the first data flow graph parameter in the first graph data structure according to a first interface parameter generation algorithm, wherein the first triplet comprises a message tag, a message size, and a destination process sequence number, the message tag corresponds to the name of the first data flow graph parameter, the message size corresponds to the size of the first data flow graph parameter, and the destination process sequence number corresponds to a process that is on the second computing node and that receives the first data flow graph parameter; and
invoking a message passing interface (MPI) sending primitive by using the first triplet as an interface parameter to send the first data flow graph parameter to the second computing node, so that the second computing node invokes an MPI receiving primitive by using, as an interface parameter, a second triplet corresponding to the first triplet, to process the first data flow graph parameter, wherein the second triplet is generated based on a second graph data structure in the second computing node according to a second interface parameter generation algorithm, and the second interface parameter generation algorithm is the same as the first interface generation algorithm.

8. The method according to claim 7, further comprising:
reading the first data flow graph parameter from a host memory in the first computing node by using the first triplet as the interface parameter and by using the MPI sending primitive to send the first data flow graph parameter to the second computing node.

9. The method according to claim 8,
wherein the first computing node further stores information about a storage device in which the first data flow graph parameter is located, and the information about the storage device indicates another storage device, and
further comprising copying the first data flow graph parameter from the other storage device into the host memory in the first computing node, wherein the other storage device is a memory in the first computing node other than the host memory.

10. A method of data transmission in a distributed computing system comprising a first computing node and a second computing node, the method comprising:
determining a name, a size, and a communication peer side identifier of a first data flow graph parameter in a second data flow graph from a second graph data structure in the second computing node, wherein the communication peer side identifier of the first data flow graph parameter in the second data flow graph parameter corresponds to the first computing node;
generating a second triplet based on the name, the size, and the communication peer side identifier of the first data flow graph parameter in the second graph data structure according to a second interface parameter generation algorithm, wherein the second triplet comprises a message tag, a message size, and a source process sequence number, the message tag corresponds to the name of the first data flow graph parameter, the message size corresponds to the size of the first data flow graph parameter, and the source process sequence number corresponds to a process that is on the first computing node and that sends the first data flow graph parameter; and
invoking a message passing interface (MPI) receiving primitive based on the second triplet, to process the first data flow graph parameter from the first computing node, wherein the first data flow graph parameter is sent by the first computing node by using an MPI sending primitive, an interface parameter of the MPI sending primitive comprises a first triplet corresponding to the second triplet, the first triplet is generated by the first computing node based on a first graph data structure in the first computing node according to a first interface parameter generation algorithm, and the second interface parameter generation algorithm is the same as the first interface generation algorithm.

11. The method according to claim 10,
wherein a first thread and a second thread run on the second computing node, a host memory in the second computing node comprises a data cache configured to store data processed based on an MPI primitive, and
further comprising:
detecting, by the first thread, the data cache in the host memory based on a message passing interface MPI probe primitive to obtain the second triplet;
invoking, by the first thread, a first MPI receiving primitive based on a second triplet in the data cache to process the first data flow graph parameter, wherein the second triplet in the data cache is obtained by the second computing node based on the MPI sending primitive; and modifying, by the second thread, a second MPI receiving primitive into an MPI wait primitive after determining that the first data flow graph parameter is processed based on the first MPI receiving primitive, wherein the second MPI receiving primitive is a receiving primitive that is not executed by the second thread and that corresponds to the first data flow graph parameter, an interface parameter of the second MPI receiving primitive comprises a second triplet generated by the second computing node, and the MPI wait primitive is used to wait for completion of execution of the first MPI receiving primitive.

* * * * *